United States Patent [19]

Corry

[11] 3,725,767
[45] Apr. 3, 1973

[54] METHOD OF AND APPARATUS FOR GENERATING THREE-PHASE SINUSOIDAL VOLTAGES

[75] Inventor: Thomas M. Corry, Goleta, Calif.

[73] Assignee: General Motors Corporation

[22] Filed: Mar. 26, 1971

[21] Appl. No.: 128,330

Related U.S. Application Data

[63] Continuation-in-part of Ser. No. 83,358, Oct. 23, 1970, abandoned.

[52] U.S. Cl..................321/5, 321/9 R, 321/DIG. 1, 323/43.5 S
[51] Int. Cl..............................................H02m 7/52
[58] Field of Search......321/5, 9 R, DIG. 1; 328/186; 307/227; 318/227; 323/43.5 S

[56] References Cited

UNITED STATES PATENTS

| | | | |
|---|---|---|---|
| 3,628,123 | 12/1971 | Rosa | 321/9 R |
| 3,652,918 | 3/1972 | Marzolf | 321/9 R |
| 3,321,693 | 5/1967 | Heinrich et al. | 321/5 |
| 3,579,081 | 5/1971 | Bates | 321/9 A |
| 3,477,010 | 11/1969 | Venard | 321/5 |
| 3,419,780 | 12/1968 | Vergez | 321/5 X |
| 3,581,212 | 7/1969 | McMurray | 321/DIG. 1 |
| 1,691,986 | 11/1928 | Nyquist | 321/DIG. 1 |
| 3,227,889 | 1/1966 | Paynter | 307/227 X |
| 3,391,323 | 7/1968 | Ikeda | 321/5 |
| 3,514,688 | 5/1970 | Martin | 321/9 R |

FOREIGN PATENTS OR APPLICATIONS

| 243,937 | 4/1965 | Austria | 321/5 |
|---|---|---|---|

Primary Examiner—William H. Beha, Jr.
Attorney—E. W. Christen, C. R. Meland

[57] ABSTRACT

A method and apparatus are provided for inverting input unidirectional source voltage to generate substantially sine-wave, three-phase, line-to-line output voltages. In the apparatus, most of the power transfer from the unidirectional source to the load conductors is effected through flat-top "power center" portions of line-to-neutral generated voltages. A minor proportion of the power to the load is supplied by an ascending and descending voltage generator which, in the three-phase system, produces alternate pairs of stepped ascending and descending voltages at a frequency equivalent to at least three times the fundamental frequency of the substantially sinusoidal output voltages. The ascending and descending voltages are selectively switched to complement the power center voltage of each phase voltage to complete the line-to-neutral waveforms. The respective line-to-neutral voltages are phase displaced 120° in relation to each other and are combined to form three-phase, line-to-line voltages characterized by a high fundamental frequency content and low harmonic distortion. In accordance with one preferred form of the method and apparatus of this invention, the waveform of the line-to-neutral voltages outboard the flat power center is based on a departure from the line-to-neutral fundamental in such fashion that higher fundamental content, more nearly sine-wave, line-to-line voltages are obtained than would be obtained from line-to-neutral voltages having less harmonic distortion. Further, in accordance with an additional preferred form of the method and apparatus of this invention, the flat-top voltage portions are generated by a square-wave inverter operated in slaved relation to the ascending and descending voltage generator through the medium of reverse voltage commutating pulses, to the square-wave generator, introduced into the respective line-to-neutral voltages by the ascending and descending voltage generator.

19 Claims, 11 Drawing Figures

United States Patent [19]
Corry

[11] 3,725,767
[45] Apr. 3, 1973

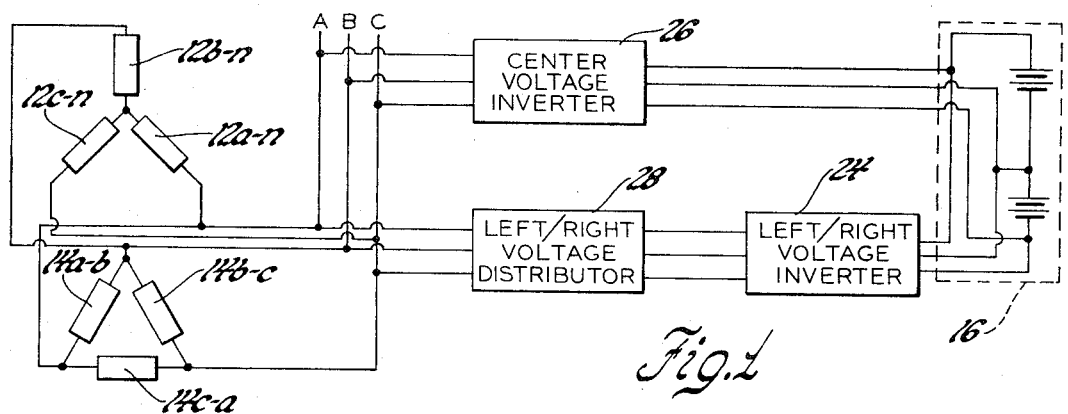
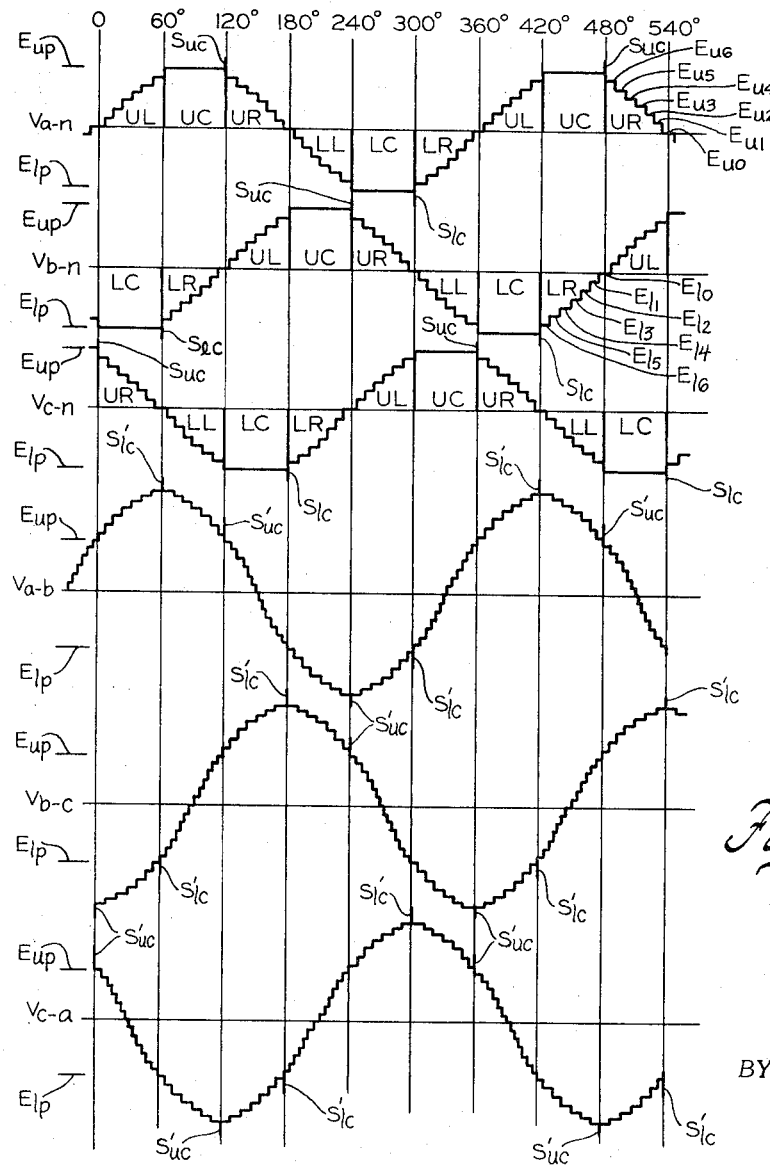
Fig. 2

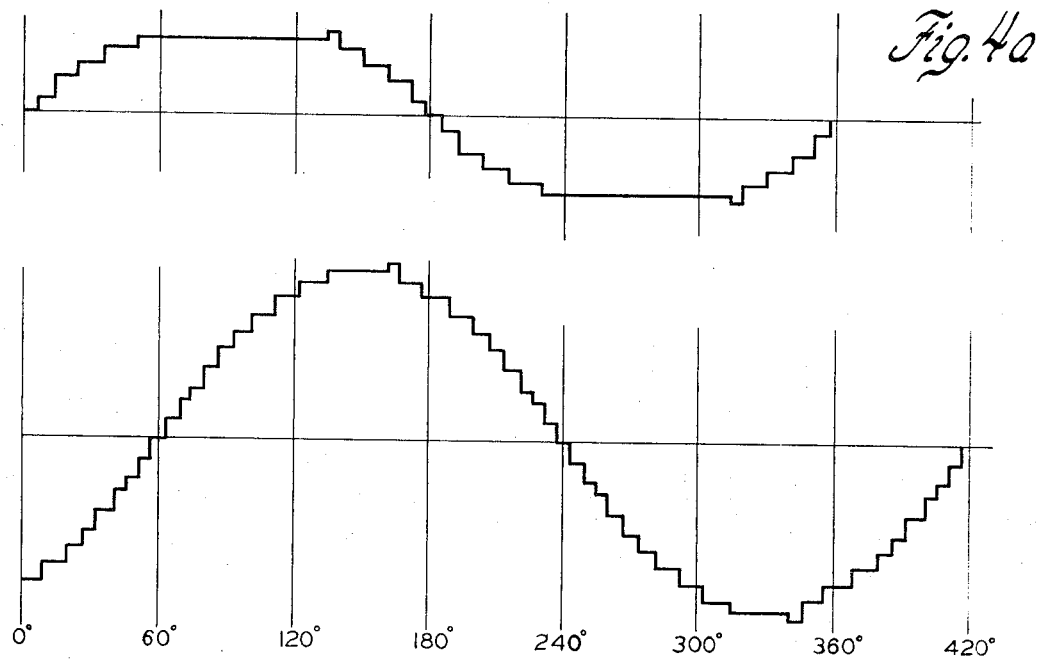
Fig.4a
Fig.4b
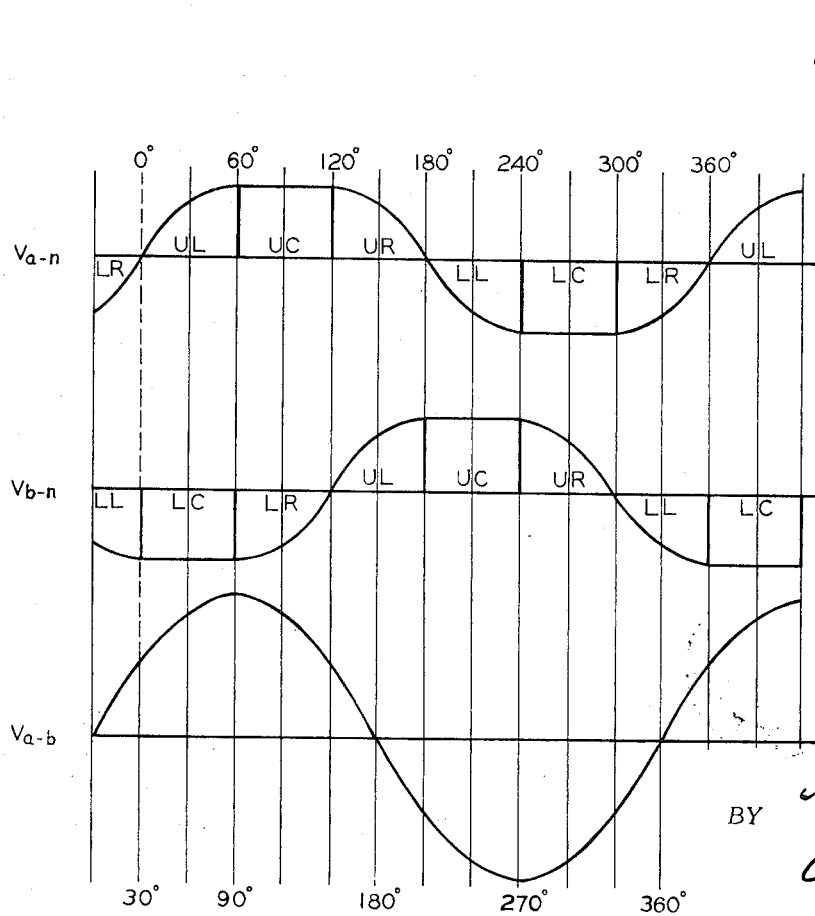
Fig.3

METHOD OF AND APPARATUS FOR GENERATING THREE-PHASE SINUSOIDAL VOLTAGES

This application is a continuation-in-part of my copending application Ser. No. 83,358 entitled "Three Phase Waveform Generator," filed Oct. 23, 1970, assigned to the same assignee as the present invention and now abandoned.

This invention relates to an improved method of and apparatus for producing a substantially sine-wave voltage having low harmonic distortion by generating flat-top voltages having stepped ascending and descending portions outboard the flat tops and combining at least two such voltages having comparatively large harmonic distortion and 120° phase displaced from each other to produce a substantially sine-wave resultant. The method and apparatus specifically disclosed herein produces a set of three substantially sine-wave, line-to-line voltages from a set of three non-sine, three-phase, line-to-neutral voltages each having a substantially flat-top portion covering at least 60° in the center part of each half-wave and a plurality of rising and falling voltages steps outboard the flat-top portion.

Unidirectional voltages having substantially constant magnitude are developed by rectification of alternating voltages, by batteries, or by other known D.C. sources. When such unidirectional voltages are inverted, it is generally desirable to provide substantially sine-wave voltages at a preselected frequency. Square-wave inverter action, using semiconductors or other switching devices to apply alternating polarity, unidirectional voltage to a load is highly effective in terms of required apparatus, efficiency, cost, reliability, and other engineering criteria. Such rectangular wave inverter action, however, produces substantially flat-top voltage waves that contain large, low order harmonics that are often unwanted and frequently unsuitable for energizing alternating current loads.

In accordance with one aspect of the present invention, the advantages of the principle of square-wave inverter action are achieved as to most of the power flow from the unidirectional voltage source to the load; at the same time, the load is provided a low harmonic content, substantially sine-wave voltage. In its preferred form, the present invention contemplates generating a set of line-to-neutral voltages defining a set of three-phase voltages in 120° phase relation to each other. Each of these line-to-neutral voltages is substantially flat-top for the center 60° of each half-cycle and to some extent outboard each such 60° portion. In the other portions of each line-to-neutral voltage, the voltage ascends or descends in steps so that when combined, the line-to-neutral voltages produce nearly sine-wave, line-to-line voltages. These ascending and descending voltages are provided by an ascending and descending voltage generator comprising a square-wave or flat-top inverter operating at the equivalent of at least three times the fundamental frequency and feeding a multiple voltage tap inductor from which the requisite stepped voltage values are taken via appropriate switches. The present invention rests in part on the discovery that a square-wave or flat-top inverter operating at three times fundamental frequency may be combined with a pair of ascending and descending voltages, repeated three times for each cycle of fundamental frequency, to construct a complete set of three-phase voltages approximating sine waves.

Another aspect of the present invention applies my discovery that in a system such as described herein the most nearly sine-wave, line-to-line voltage is not created by the best approximation to a sine-wave, line-to-neutral voltage. According to my discovery, it is preferable to generate line-to-neutral voltages that depart to a greater degree from the line-to-neutral sine waveform than the stepped nature of the line-to-neutral voltage requires. It can be shown theoretically that with a set of three-phase, line-to-neutral voltages characterized by any arbitrary function in a 60° portion of each half-cycle, it is possible to construct the remaining 120° of each half-cycle in such fashion as to produce a set of pure sine-wave, line-to-line voltages. Further, in the case of a set of line-to-neutral voltages each having a flat-top portion extending over 60°, the perfect theoretical wave shape that produces pure sine-wave, line-to-line voltages is a displaced sine-wave portion of the line-to-line waveform. In the method and apparatus of the present invention, this wave, in turn, is approximated in stepped fashion including extending the flat-top portion beyond 60°, all of which provides a number of advantages (including improved efficiency, enhanced reliability, and lesser cost) as described in further detail hereafter.

It is therefore a general object of the present invention to provide an improved method of and apparatus for generating a sinusoidal voltage from a unidirectional voltage source.

Further it is an object of the present invention to provide a method of and apparatus for generating a set of three substantially sine-wave phase voltages from a unidirectional voltage source wherein most of the power is transferred via a square-wave or flat-top inverter and wherein the remaining power is transferred via a comparatively small, efficient, ascending and descending voltage generator operating at three times fundamental frequency. In this manner, the size and weight of the voltage system are minimized.

Another object of the present invention is to provide a method of and an apparatus for generating substantially sine-wave voltages in accordance with the foregoing objects wherein the line-to-line voltages are generated from stepped line-to-neutral voltages having steps so chosen that they combine, in the line-to-line voltages, to produce a very close approximation to a pure sine wave having a high fundamental content and low harmonic distortion.

Further it is an object of the present invention to provide an improved method of and apparatus for generating three-phase substantially sinusoidal voltages from a substantially unidirectional voltage source in such fashion that a major proportion of the total energy is transferred by direct connection in an efficient "power center" portion of each half-wave through a flat-top or square wave inverter and a minor proportion of the total energy is transferred in the stepped portions of each half-wave outboard the power center portion.

Still another object of the present invention is to provide an improved method of and apparatus for generating three-phase substantially sinusoidal voltage from a substantially constant voltage unidirectional source in such fashion that a comparatively small number of ascending and descending voltage steps in each of the line-to-neutral voltage waves produces a line-to-line voltage wave closely approximating a pure sine wave.

Yet another object of the present invention is to provide an improved method of and apparatus for generating three-phase substantially sinusoidal voltages from a substantially constant unidirectional source in such fashion that the most pronounced harmonics present in the line-to-line generated voltages waves are of a high order and therefore are tolerable to the load apparatus, are inherently filtered, or can be substantially reduced by small, efficient, and inexpensive filters.

Still another object of the present invention is to provide a method of and apparatus for generating a set of three line-to-line voltages substantially free from harmonic distortion from a unidirectional voltage source wherein efficient, reliable, low cost, and small semiconductor devices can be advantageously used and wherein commutation is achieved through internal action of the basic apparatus without supplementary energy storage circuitry.

A further object of the present invention is to provide a method of and apparatus for generating three-phase voltages from a unidirectional voltage source wherein a major proportion of the energy is transferred via a flat-top or square-wave inverter which operates in slaved relation to an ascending and descending voltage generator, the latter operating at three times fundamental frequency and producing reverse bias commutating pulses on the line voltages that serve to commutate the flat-top or square-wave inverter in slaved relation to the operation of the ascending and descending voltage generator.

Yet another object of the present invention is to provide an improved method of and apparatus for inverting the voltage of a unidirectional source to form substantially sine-wave output voltages in response to appropriate clock or trigger pulses suitable for paralleling with other A.C. sources and for connecting to loads of low power factor.

The novel features which I believe to be characteristic of my invention are set forth in the appended claims. My invention itself, however, together with further objects and advantages thereof, can be best understood by reference to the following description, taken in connection with the accompanying drawings, in which:

FIG. 2 is a diagram showing, in general form, three line-to-neutral and three line-to-line voltages generated in accordance with one form of the present invention;

FIG. 3 is a diagram showing a pair of line-to-neutral voltages with flat 60° power center portions and their combination to form a sine-wave, line-to-line voltage;

FIGS. 4a and 4b are charts, respectively, of a specific line-to-neutral stepped voltage designed in accordance with the present invention to provide small line-to-line harmonic distortion and the specific line-to-line voltage produced thereby;

FIGS. 6 and 7 are timing diagrams for the apparatus of FIG. 5, applicable respectively to the ascending and descending voltage generator and the flat-top or square-wave inverter when producing a 60° power center;

Figures 6, 7:
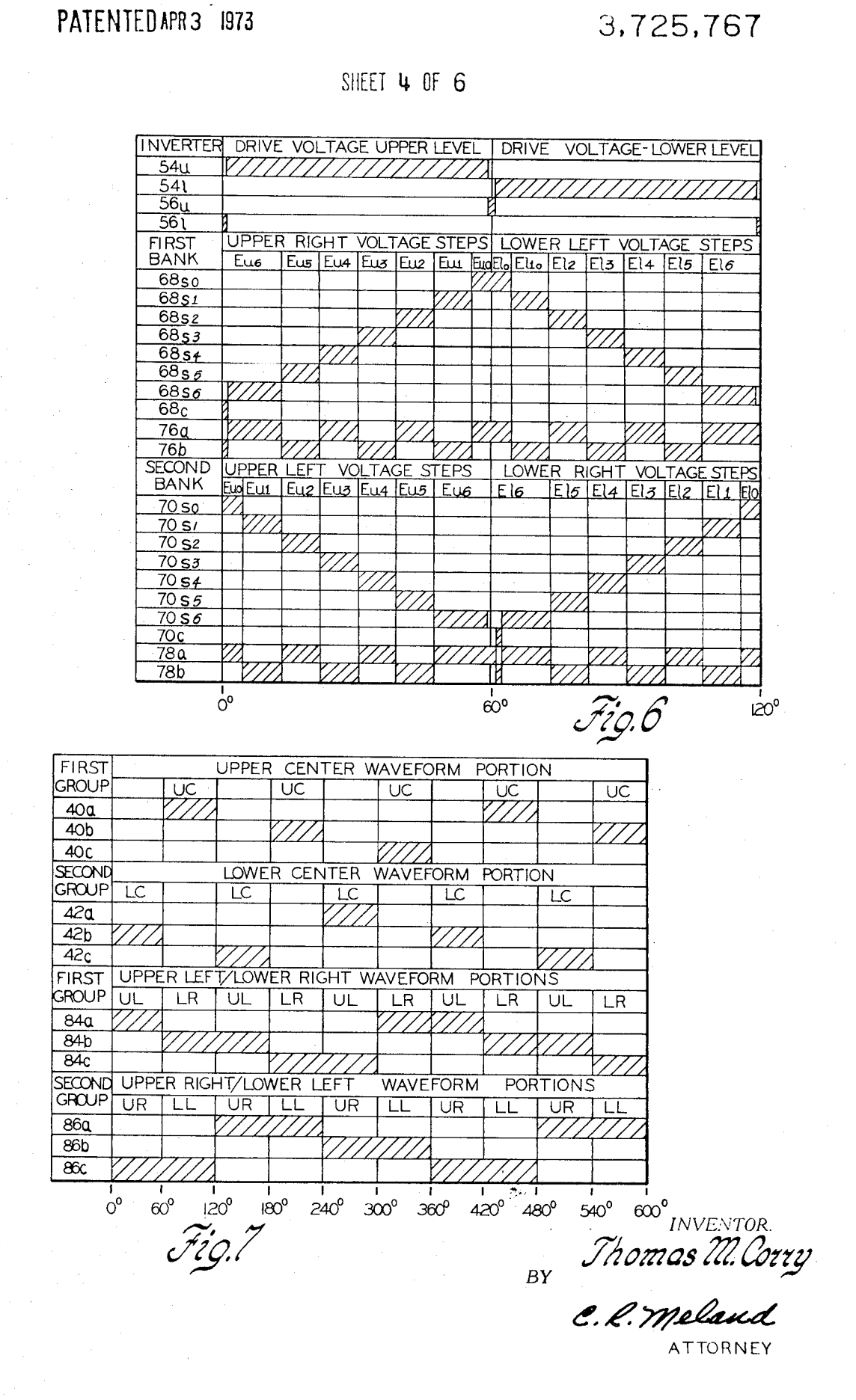
Figures 8, 9:
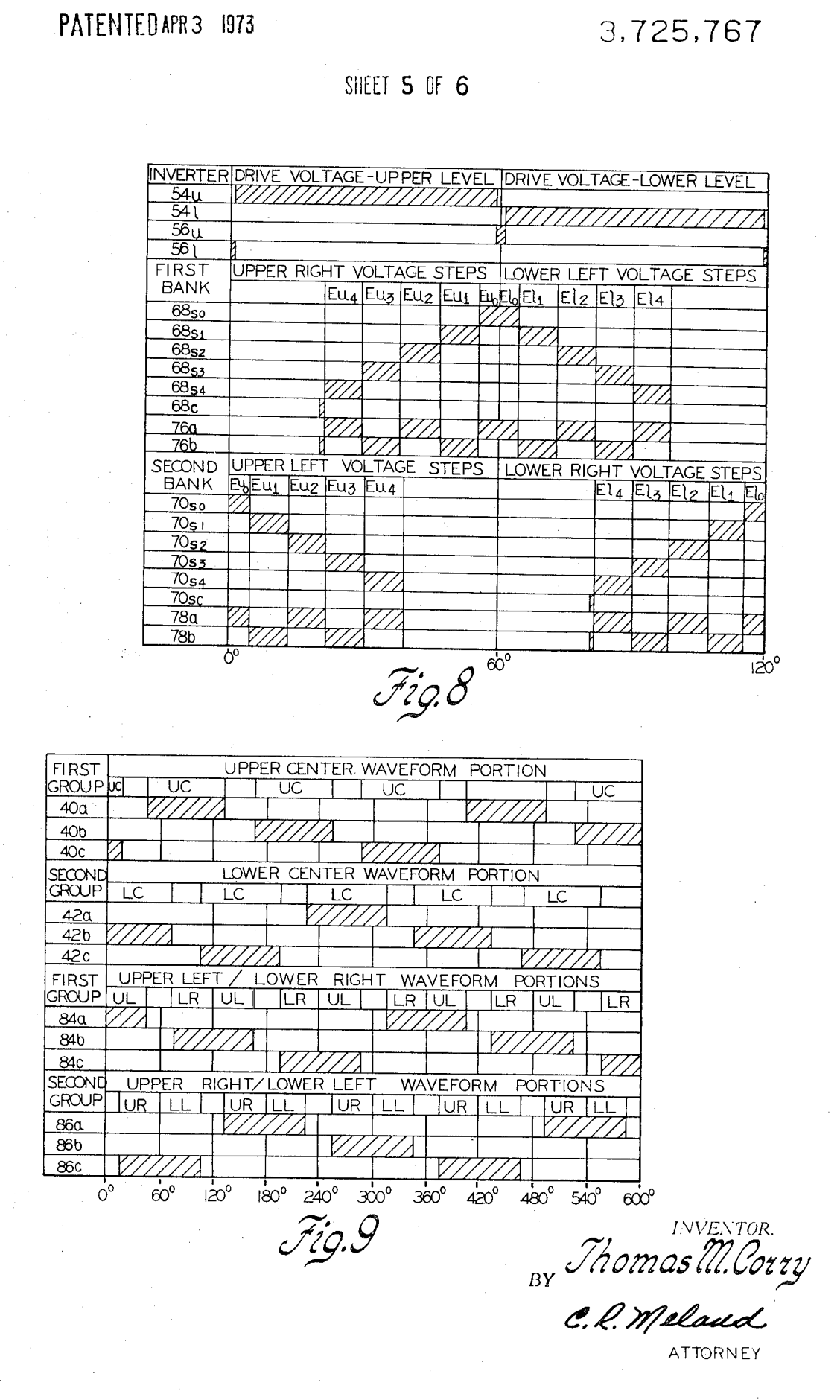
Figure 10:
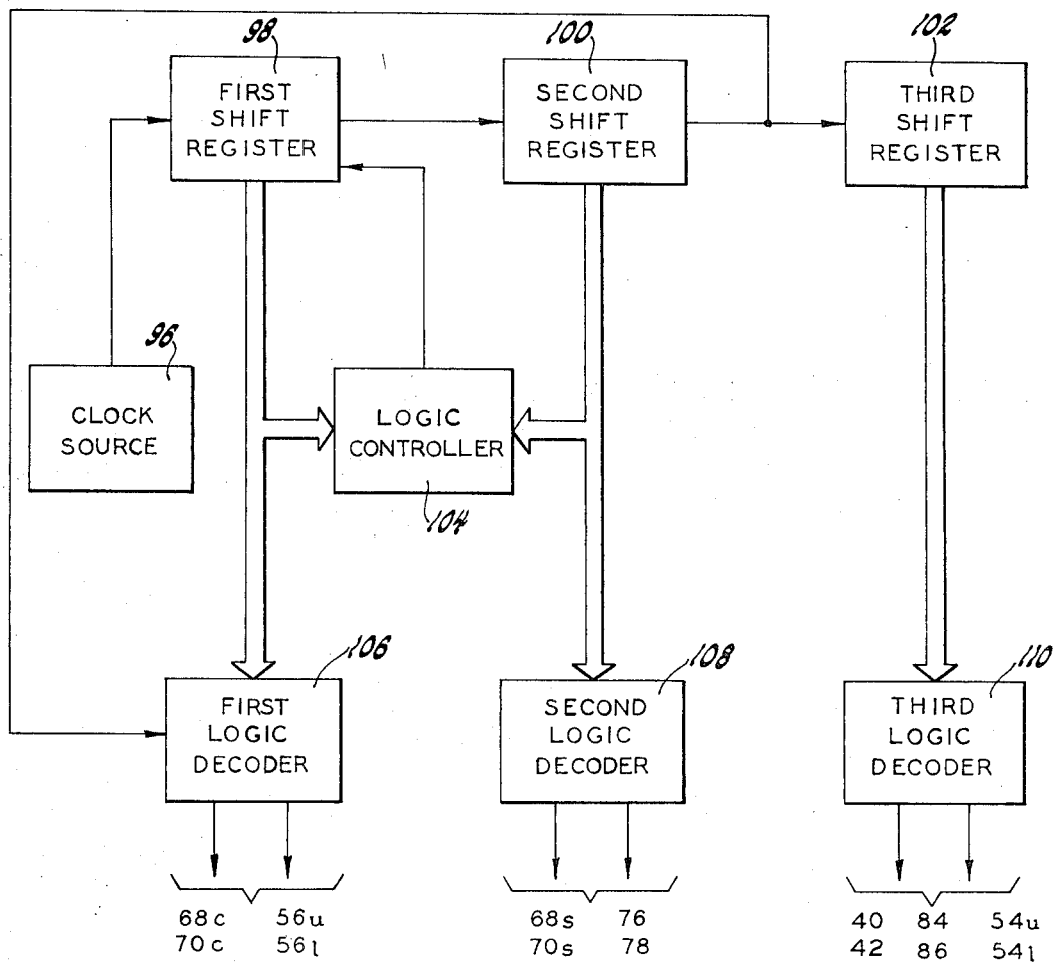

FIGS. 8 and 9 are timing diagrams, similar to FIGS. 6 and 7, respectively, but showing the timing for an illustrative line-to-neutral wave having a power center exceeding 60° in extent; and FIG. 10 is a block diagram of a timing control apparatus for the present invention.

GENERAL DESCRIPTION

Figure 1:
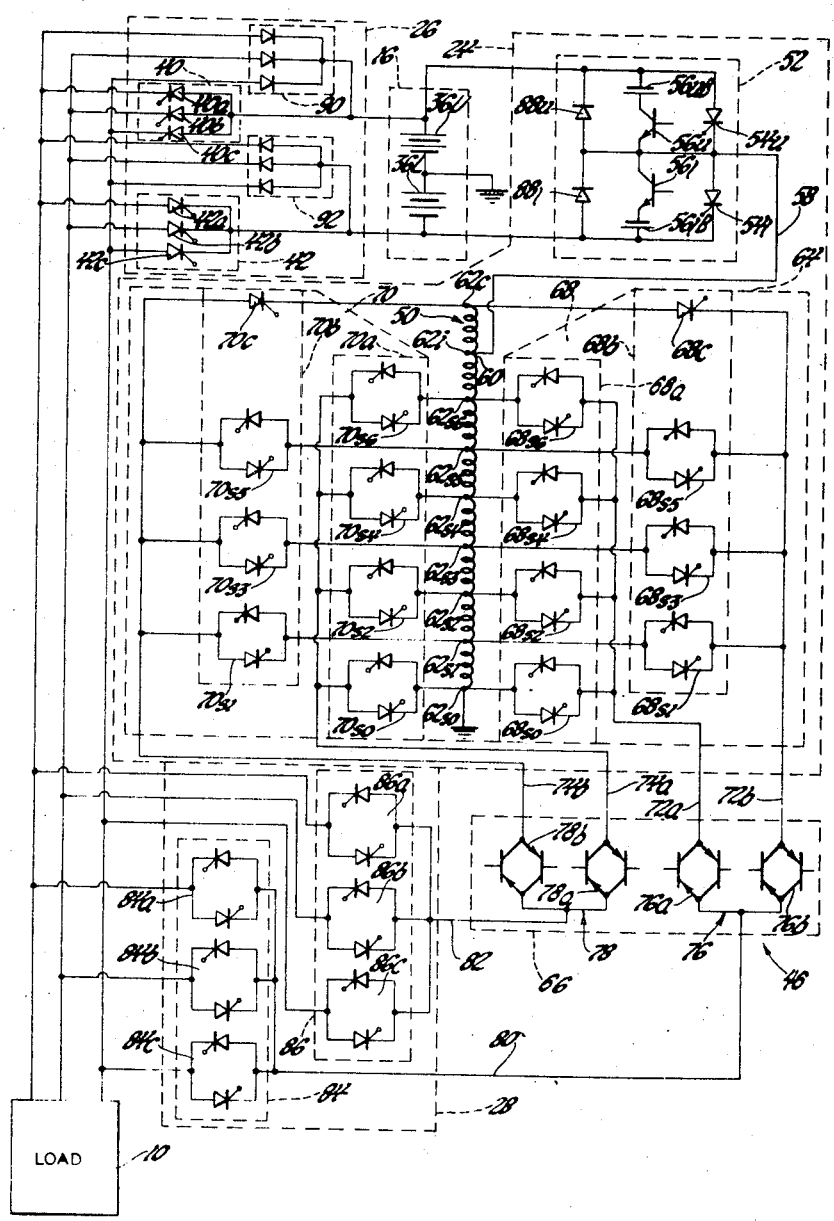
FIG. 1 is a circuit diagram, partially in block form, showing a three-phase power system of the type to which the present invention is applicable.

FIG. 1 shows in diagrammatic and block form the three-phase power system of the present invention. The unidirectional power source, indicated at 16, is a source of substantially constant potential, having a center tap as shown. The source may, for example, be a battery, a rotating d-c generator, or rectified a-c voltage. A center voltage inverter indicated at 26 is connected to the source 16, and as described in more detail hereafter, this inverter applies line-to-neutral flat-top voltages directly from the source 16 to the three output lines A, B, and C in three-phase substantially 60° duration voltage pulses. These voltage pulses are shown as UC (upper center) and LC (lower center) in the respective line-to-neutral voltages shown in FIG. 2. These voltages pulses are referred to hereafter as the upper center and lower center voltage pulses and, alternatively, as the line-to-neutral waveform power center. As is discussed in more detail hereafter, these power center voltage pulses are developed by highly efficient inverter action using comparatively simple semi-conductor or similar switching devices. More than 60 percent of the total power flow from the source 16 to the load takes place through the center voltage inverter 26 accounting in part for the overall small size and high efficiency achieved with the present invention.

The three line conductors A, B, and C receive left/right voltages from the source 16 through the left/right or ascending and descending voltage generator or inverter 24 and the left/right voltage distributor 28. The inverter 24 produces the increasing and decreasing voltages waves LL (lower left), UL (upper left), LR (lower right), and UR (upper right) of the three line-to-neutral voltages, and the voltage distributor 28 switches the respective voltages to the appropriate line conductors to construct the respective line-to-neutral voltages shown in FIG. 2. switches in a different one of the Respective pairs of the line-to-neutral voltages $V_{a-n}$, $V_{b-n}$, and $V_{c-n}$ in FIG. 2 are combined to produce the line-to-line voltages $V_{a-b}$, $V_{b-c}$, and $V_{c-a}$. In the drawing of FIG. 1, a Y-connected load comprising the load elements $12_{a-n}$, $12_{b-n}$, and $12_{c-n}$ and a delta connected load comprising load elements $14_{a-b}$, $14_{b-c}$, and $14_{c-a}$ are shown connected for A.C. excitation by the conductors A, B, and C. The full advantages of the present invention are achieved even if the load is not balanced. As described below, a load neutral can be provided by means other than a balanced Y-connected load. A common neutral connection (not shown) can be added interconnecting source and load, for example, to accommodate a single-phase load, but such connection increases the harmonic content to the singephase load which, of course, can be remedied by appropriate filtering.

In the flat-top, line-to-neutral voltage waveforms $V_{a-n}$, $V_{b-n}$, and $V_{c-n}$ shown in FIG. 2, each cycle of each of the three line-to-neutral voltage waveforms includes an upper center waveform portion UC, an upper right waveform portion UR, a lower left waveform portion LL, a lower center waveform portion LC, and a lower right waveform portion LR. The six waveform portions UC, UL, LL, LC, LR, and UR are of approximately equal duration, each extending over approximately 60 electrical degrees in each cycle of the respective line-to-neutral waveforms.

As shown in the graphs, the upper center waveform portion UC is defined by an upper center voltage segment $V_{uc}$ which is substantially constant at an upper potential $E_{up}$ above the neutral potential $E_{np}$. Similarly, the lower center waveform portion LC is defined by a lower center voltage segment $V_{lc}$ which is substantially constant at a lower potential $E_{lp}$ below the neutral potential $E_{np}$. The upper left waveform portion UL is defined by an upper left voltage segment $V_{ul}$ which ascends in a series of voltage steps from the neutral potential $E_{np}$ to the upper potential $E_{up}$. The upper right waveform portion UR is defined by an upper right voltage segment $V_{ur}$ which descends in a series of voltage steps from the upper potential $E_{up}$ to the neutral potential $E_{np}$. The lower left waveform portion LL is defined by a lower left voltage segment $V_{ll}$ which descends in a series of voltage steps from the neutral potential $E_{np}$ to the lower potential $E_{lp}$. The lower right waveform portion is defined by a lower right voltage segment $V_{lr}$ which ascends in a series of voltage steps from the lower potential $E_{lp}$ to the neutral potential $E_{np}$.

Due to the symmetry of the line-to-neutral voltage waveforms $V_{a-n}$, $V_{b-n}$, and $V_{c-n}$, the upper center, left and right waveform portions UC, UL, and UR, and the lower center, left and right waveform portions LC, LL, and LR are of equal magnitude, respectively, relative to the inverter neutral potential $E_{np}$. Further, as shown, the respective line-to-neutral waveforms have half-cycle symmetry; each half-cycle is symmetrical about the 90° point from the prior zero crossing.

Although the line-to-neutral voltage waveforms $V_{a-n}$, $V_{b-n}$, and $V_{c-n}$ do not depart substantially from a sine wave, for the purposes of the present invention, this departure is deliberately made greater than the minimum possible departure when viewed from the standpoint of the line-to-neutral voltage. In this connection, it should be noted that the voltages "seen" by the inverters 24 and 26 and by the distributor 29 are line-to-neutral voltages in relation to the center tapped source 16. As described hereafter, the center voltage inverter 26 is a comparatively simple, efficient, and reliable flat-top inverter, and the inverter 24 is a more complex, less efficient, and less reliable step voltage generator making it desirable to transfer maximum energy via the inverter 26 and minimum energy via inverter 24. This proportioning of the power is accomplished in accordance with the present invention by extending the flat-top portion of the line-to-neutral voltage wave as long as possible. It should further be noted that the voltages "seen" by line-to-line connected loads such as $14_{a-b}$, $14_{a-c}$, and $14_{b-c}$ are not the line-to-neutral voltages, but instead are the line-to-line voltages. As is further discussed hereafter, even with a 60° flat-top, line-to-neutral wave, it is possible to generate pure sine-wave, line-to-line voltages. As a practical matter, it is possible to use a flat-top, line-to-neutral wave exceeding 60° in conjunction with stepped rising and falling portions (such that the line-to-neutral voltage has high harmonic content) and still obtain line-to-line voltages with relatively harmonic content largely confined to high order harmonics.

SELECTION OF WAVEFORMS

The total harmonic distortion the in (thd) line-to-neutral voltage waveforms $V_{a-n}$, $V_{b-n}$, and $V_{c-n}$ of FIG. 2 is determined by the duration of the center voltage wave portions UC and LC and by the configuration of the upper and lower left and right waveform portions UL, UR, LL, and LR. Since the line-to-line voltage waveforms $V_{a-b}$, $V_{b-c}$, and $V_{c-a}$ are derived from the line-to-neutral voltage waveforms $V_{a-n}$, $V_{b-n}$, and $V_{c-n}$, the amount of harmonic distortion in the line-to-line voltage waveforms $V_{a-b}$, $V_{b-c}$, and $V_{c-a}$ is dependent upon the amount of harmonic distortion in the line-to-neutral voltage waveforms $V_{a-n}$, $V_{b-n}$, and $V_{c-n}$, although the third harmonic and its multiples are not present in the line-to-line voltages. The action can best be understood by examining a cycle of two of the line-to-neutral voltage waveforms and how they combine to form a line-to-line voltage.

Reference should now be made to FIG. 3 wherein the respective half-cycles of line-to-neutral waves $V_{a-n}$ and $V_{b-n}$ include center, left, and right waveform portions. These are indicated as UC, UL, and UR for the positive half-cycles and LC, LL, and LR for the negative half-cycles. Given the constraint that the upper center waveform portion UC is substantially constant at the upper potential $E_{up}$ over the interval extending at least from 60 electrical degrees to 120 electrical degrees, the upper left and right waveform portions UL and UR can be specified to minimize the total harmonic distortion in the line-to-line voltage waveforms $V_{a-b}$, $V_{b-c}$, and $V_{c-a}$ by approximating as closely as possible the condition for zero harmonics in the line-to-line waveform.

It is possible to eliminate, theoretically, the entire harmonic content of the line-to-line voltages of a three-phase system having flat-top or other fixed waveforms over not more than a third of each half-cycle of the line-to-neutral voltage. In the case of a line-to-neutral voltage having a flat-top between 60 and 120 degrees of amplitude K, this cancellation occurs when the line-to-neutral voltage in the 0°–60° region follows the formula:

$$Y = K(2\sin(wt + \pi/6) - 1)$$

where $K$ is the magnitude of the flat-top wave in the 60° to 120° region. In view of the symmetry of the line-to-neutral wave, the above formula defines the total waveform since it covers the 0° to 90° portion of the positive half-cycle and the wave from 90° to 180° is defined by the symmetry as is the negative half-cycle. The voltages $V_{a-n}$ and $V_{b-n}$ of FIG. 3 are defined in this fashion. Their combination, forming a pure sine line-to-line voltage having a peak equal to twice the magnitude of the line-to-neutral flat-top is shown at $V_{a-b}$.

The above equation defines the upper left and upper right waves (as well as the lower left and lower right waves) in terms of a continuous voltage variation. It represents an ideal infinite step voltage wave, rather than the finite step-type voltage wave that can be most efficiently provided in practice. In order to achieve most of the advantages of the ideal wave while still obtaining the practical advantages of step-type voltage waves, the upper and lower left and right voltage waves are developed in the form of steps that approximate the ideal waves. In accordance with the present invention, the durations and magnitudes of the individual steps are selected to provide the most effective fit to the ideal waves, taking into account the constraints imposed by the particular application and engineering tradeoffs between low harmonic distortion and complexity, size, reliability, efficiency, etc. In addition to the smooth wave and step wave ascending and descending waveforms, it should be appreciated that other ascending and descending waveform generation techniques, such as pulse modulation, could be substituted in the waveform generation method of the present invention.

In accordance with the preferred embodiment of the present invention, the line-to-neutral voltage waveform is designed by commencing with an approximation to the theoretical waveform of FIG. 3 providing harmonic-free line-to-line voltages. If, for example, it is determined that the line-to-neutral voltage is to rise in five steps from zero to the center voltage value, these five steps are established as to their respective amplitudes and durations so as to most closely fit the theoretically perfect continuous curve. This may be done by applying mathematical techniques, such as the least-square error fit process, or by more simple eye estimating processes. The resultant stepped voltage wave, which is a good approximation of the optimum, is then used as the basis for constructing the apparatus by which the waveform is generated, or is refined by iterative techniques to achieve a more favorite approximation to the theoretically perfect curve.

In the iterative process used to define a more favorable approximation to the theoretically perfect curve, one basis for iteration is the total harmonic distortion of the line-to-line wave. One such process of iteration is as follows:

1. The stepped approximation to the theoretically perfect curve is made by graphical, mathematical or other estimation based on the number or other criteria for the voltage steps.
2. The fundamental component of the resultant line-to-line voltage is determined (for example, by Fourier analysis).
3. The RMS value of the line-to-line voltage is determined (for example, by point-by-point summation of the squares of the voltages at successive points in the wave).
4. Total harmonic distortion (THD) of the line-to-line wave is determined from the fundamental component and the RMS value, using the relation:

$$\text{THD} = 100 \sqrt{(Ew^2/Ef^2) - 1}$$

where $Ew$ is the RMS value of the stepped wave and $Ef$ is the RMS value of the waveform fundamental.

5. A parameter such as the magnitude of one of the voltage steps, or the timing of a step, or both, is varied in a small amount.
6. The total harmonic distortion is recomputed using the new wave.
7. The new line-to-line total harmonic distortion is compared with the first line-to-line total harmonic distortion and, depending on the extent and sense of the change in harmonic distortion, a new variation made in the parameter.
8. The foregoing steps are repeated with variations in the different parameters until the most effective approximation is achieved.

The foregoing iterative process may be carried out using some particular harmonic distortion as a criterion of line-to-line voltage merit. For example, harmonics above some minimum order may be ignored because they have no operational consequence. In defining the line-to-neutral wave using this alternative approach, the computation, or tests, do not involve determining the RMS value of the line-to-line wave, but rather are normally carried out by Fourier analysis or some other method that is effective for the particular harmonics of interest.

The results obtained with the above technique are illustrated by the following normalized examples:

EXAMPLE 1

(Flat-top Power Center Normalized to Amplitude 1 — 3 Voltage Steps)

The theoretical line-to-neutral voltage required to produce a pure sine-wave, line-to-line voltage was approximated in three voltage steps by a wave composed of voltages having amplitudes of 0 (0° to 5.8°), 0.36 (5.8° to 17.3°), 0.70 (17.3° to 34.1°), and 1.00 (34.1° to 90°). The rest of the waveform is defined by this one-fourth cycle due to the symmetry of the wave. In this wave, the power center having amplitude one is 111.8°, 51.8° in excess of the 60° power center. While the small number of steps and the expanded power center tend to increase the harmonic content of the line-to-line voltage, the total harmonic distortion is still comparatively low, on the order of 6.2 percent. The line-to-neutral total harmonic distortion is on the order of 19.3 percent, more than three times as great. One advantage of this wave, in addition to the simplicity attained with the small number of steps, resides in the fact that the power center accounts for over 85 percent of the total energy transfer. The largest harmonic in the line-to-line voltage with this wave is the 29th having a value under 2.5 percent of the fundamental. The 25th, 35th, and 37th are all between 1.5 percent and 2.0 percent.

EXAMPLE 2

(Flat-top Power Center Normalized to Amplitude 1 — 4 Voltage Steps)

The theoretical line-to-neutral voltage required to produce a pure sine-wave, line-to-line voltage was approximated with four voltage steps by a wave symmetrical about the 90° line composed of voltages having amplitudes of 0 (0° to 4.6°), 0.28 (4.6° to 13.7°), 0.55 (13.7° to 26.1°), 0.80 (26.1° to 39.9°), and 1.00 (39.9° to 90°). The power center for this wave is 100.2°, 40.2° in excess of the 60° value. The line-to-line total harmonic distortion is on the order of 4.8 percent. The line-to-neutral total harmonic distortion is on the order of 16.8 percent, more than three times as great. Nearly 80 percent of the total energy transfer is in the power center. The principal harmonics in the line-to-line voltage with this wave are the 35th (1-3 percent), the 37th, and the 41st (1.2 percent each). No harmonic below the 25th exceeds 1 percent.

EXAMPLE 3

(Flat-top Power Center Normalized to Amplitude 1 — 5 Voltage Steps)

The theoretical line-to-neutral voltage required to produce a pure sine-wave, line-to-line voltage was approximated with five voltage steps by a wave symmetrical about the 90° line composed of voltages having amplitudes of 0 (0° to 3.6°), 0.22 (3.6° to 11°), 0.45 (11° to 21°), 0.68 (21° to 32.2°), 0.87 (32.2° to 43.6°), and 1.00 (43.6° to 90°). The power center for this wave is 92.8°, 32.8° in excess of the 60° power center. The total harmonic distortion of the line-to-line voltage is on the order of 4.0 percent; the total harmonic distortion of the line-to-neutral voltage is on the order of 15.8 percent, almost four times as large. The power center accounts for approximately 75 percent of the total energy transfer. The principal harmonics in the line-to-line voltage with this wave are the 35th (1.4%) and the 47th (1.0%).

EXAMPLE 4

(Flat-top Power Center Normalized to Amplitude 1 — 6 Voltage Steps)

The theoretical line-to-neutral voltage required to produce a pure sine-wave, line-to-line voltage was approximated by six voltage steps by a wave composed of voltages having amplitudes of 0 (0° to 3.1°), 0.19 (3.1° to 9.4°), 0.38 (9.4° to 17.5°), 0.55 (17.5° to 23.2°), 0.71 (23.2° to 32.6°), 0.88 (32.6° to 45.6°), and 1.00 (45.6° to 90°). The power center for this wave is 88.8°, 28.8° in excess of the 60° power center. The total harmonic distortion of the line-to-line voltage is on the order of 3.3 percent; the total harmonic distortion of the line-to-neutral voltage is on the order of 15.4 percent, well over four times as great. The power center accounts for over 70 percent of the total energy transfer. The principal harmonic in the line-to-line voltage with this wave is the 53rd, with an amplitude of about 1.22 percent.

EXAMPLE 5

(Flat-top Power Center Normalized to Amplitude 1 — 7 Voltage Steps)

The theoretical line-to-neutral voltage required to produce a pure sine-wave, line-to-line voltage was approximated by seven voltage steps by a wave symmetrical about the 90° line composed of voltages having amplitudes of 0 (0° to 2.7°), 0.16 (2.7° to 7.9°), 0.32 (7.9° to 14.9°), 0.47 (14.9° to 20°), 0.62 (20° to 27.9°), 0.76 (27.9° to 36°), 0.90 (36° to 47.9°), and 1.00 (47.9° to 90°). The power center for this wave is 84.2°, 24.2° in excess of the 60° power center. The line-to-line total harmonic distortion is on the order of 2.9 percent. The total harmonic distortion of the line-to-neutral voltage is on the order of 14.4 percent, well over four times as great. The power center accounts for about 68 percent of the total energy transfer. No harmonic in the line-to-line voltage exceeds 1 percent.

As described in more detail hereafter in connection with one form of apparatus for practicing the present invention, a trigger or commutating pulse may be introduced by the left/right voltage generator 24 and the left/right voltage distributor 28 into the line conductors A, B, and C to effect commutation of the center voltage generator 26. The purpose of such pulse is to provide positive and effective commutation in the center voltage generator 26 to terminate conduction in each phase at the instant the left/right voltage generator 24 commences the descending or ascending stepped wave. The pulse in each line-to-neutral voltage is, of course, made as small as possible; however, it is inherently necessary to distort the line-to-neutral voltage somewhat to provide the requisite commutation. The total effect of the commutating pulse on the line-to-line voltage is reduced, however, by the fact that it is effective, as to the center voltage generator 26, as a line-to-neutral voltage, whereas it appears at the line-to-line connected load as a line-to-line voltage. Stated differently, the trigger pulse may be viewed as a constraint on the line-to-neutral voltage which becomes a consideration in determining the total line-to-neutral voltage wave that gives the most favorable sine-wave, line-to-line voltage.

The foregoing is illustrated by the following example:

EXAMPLE 6

(Flat-top Power Center Normalized to Amplitude 1 — 5 Voltage Steps with Commutation Pulse)

The theoretical line-to-neutral voltage required to produce a pure sine-wave, line-to-line voltage was approximated with six voltage steps by a wave composed of voltages having amplitudes of 0 (0° to 3.6°), 0.22 (3.6° to 11.1°), 0.47 (11.1° to 21.2°), 0.69 (21.2° to 32.2°), 0.88 (32.2° to 43.9°), and 1.00 (43.9° to 90°). In addition, a commutation pulse of 1.1 was introduced in the line-to-neutral voltage in the 5° interval from 131.1° to 136.1°. This wave will be recognized as similar but not identical to the wave of Example 3 above. The resultant line-to-neutral and line-to-line voltages are shown in FIGS. 4a and 4b, respectively. The power center for this wave, including the commutation pulse, is 92.2°. Over 68 percent of the total energy is transferred in the power center. Total line-to-line harmonic distortion is on the order of 4.2 percent. The line-to-neutral harmonic distortion is on the order of 16.7 percent, nearly four times as large. The only line-to-line harmonics in excess of 1 percent are the 29th (1.07 percent), the 31st (1.13 percent), the 35th (1.23 percent), and the 43rd (1.14 percent). Total harmonic distortion of the line-to-line voltage of this wave was reduced to about 1 percent by a comparatively small LC low-pass filter tuned approximately to the 14th harmonic and composed of a series inductance in each line and Y-connected capacitors on the load side of the inductors, the respective values for each phase being, in the apparatus constructed, 90 microhenries and 2 microfarads.

In the foregoing discussion of waveshapes, the respective power center portions of the line-to-neutral waves extend over more than 60°. This configuration has a number of advantages when compared to the results when 60° power centers are used, including: (1) lower line-to-line voltage harmonic content in relation to the number of steps in the right and left wave portions; (2) less duty on the current turn-off devices in the apparatus, with the incident greater system efficiency and reliability with fewer silicon controlled rectifiers and associated other devices; (3) a greater amount of energy transfer to the load through the relatively small and efficient center voltage generator apparatus; and (4) the availability of more time for a trigger or commutation pulse fed to the center voltage generator through the line conductors from the left/right or ascending-descending voltage distributor. The following examples use 60° power center portions in conjunction with the stepped waveform development technique of the present invention.

EXAMPLE 7

(Flat-top Power Center Normalized to Amplitude 1 — 4 Voltage Steps)

The theoretical line-to-neutral voltage required to produce a pure sine-wave, line-to-line voltage was approximated with four voltage steps by a wave symmetrical about the 90° line composed of voltages having amplitudes of 0 (0° to 10.6°), 0.30 (10.6° to 25.2°), 0.56 (25.2° to 41.1°), 0.74 (41.1° to 60°), and 1.00 (60° to 90°). The line-to-line total harmonic distortion is on the order of 5.6 percent; the line-to-neutral total harmonic distortion is on the order of 9.9 percent, nearly twice as great. The 60° power center of this wave transfers approximately 65 percent of the total energy. The principal harmonic in the line-to-line voltage is the 29th (2.17 percent); while the 19th, 23rd, 25th, 31st, 35th, 43rd, 49th, and 71st have values in the range of 1 percent to 2 percent of the fundamental, only the 23rd exceeds 1.5 percent. No other harmonic below the 100th exceeds 1 percent.

EXAMPLE 8

(Flat-top Power Center Normalized to Amplitude 1 — 5 Voltage Steps)

The theoretical line-to-neutral voltage required to produce a pure sine-wave, line-to-line voltage was approximated with five voltage steps by a wave symmetrical about the 90° line composed of voltages having amplitudes of 0 (0° to 8.4°), 0.25 (8.4° to 20.1°), 0.49 (20.1° to 32.4°), 0.67 (32.4° to 45.2°), 0.79 (45.2° to 60°), and 1.00 (60° to 90°). The total harmonic distortion of the line-to-line voltage for this wave is on the order of 4.5 percent, and the total harmonic distortion of the line-to-neutral voltage is on the order of 7.9 percent. The 60° power center accounts for approximately 60 percent of the total energy transfer. The principal harmonics in the line-to-line voltage are the 25th, 29th, 35th, 37th, 55th, 61st, and 89th with the 29th the largest at 1.68 percent.

EXAMPLE 9

(Flat-top Power Center Normalized to Amplitude 1 — 6 Voltage Steps)

The theoretical line-to-neutral voltage required to produce a pure sine-wave, line-to-line voltage was approximated with six voltage steps by a wave symmetrical about the 90° line composed of voltages having amplitudes of 0 (0° to 7.3°), 0.20 (7.3° to 16.6°), 0.40 (16.6° to 26.7°), 0.58 (26.7° to 37.2°), 0.71 (37.2° to 48°), 0.80 (48° to 60°), and 1.00 (60° to 90°). The total harmonic distortion of the line-to-line voltage for this waveform is on the order of 3.8 percent, and the total harmonic distortion for the line-to-neutral voltage is on the order of 7.0 percent. The 60° power center accounts for approximately 60 percent of the energy transfer. The principal harmonics in the line-to-line voltage of this wave are the 35th, 41st, and 43rd, with the 35th the largest at 1.37 percent.

EXAMPLE 10

(Flat-top Power Center Normalized to Amplitude 1 — 7 Voltage Steps)

The theoretical line-to-neutral voltage required to produce a pure sine-wave, line-to-line voltage was approximated with seven voltage steps by a wave symmetrical about the 90° line composed of voltages having amplitudes of 0 (0° to 6.6°), 0.17 (6.6° to 14.4°), 0.36 (14.4° to 23.1°), 0.52 (23.1° to 31.7°), 0.65 (31.7° to 40.7°), 0.75 (40.7° to 49.9°), 0.81 (49.9° to 60°), and 1.00 (60° to 90°). For this waveform, the total harmonic distortion of the line-to-line voltage is on the order of 3.3 percent, and the total harmonic distortion of the line-to-neutral voltage is on the order of 6.6 percent. The 60° power center accounts for approximately 60 percent of the total energy transfer. The only harmonic in the line-to-line voltage below the 100th in excess of 1 percent is the 47th, with an amplitude of approximately 1.26 percent.

ACCOMMODATION OF COMMON CONNECTED SINGLE PHASE LOADS

The present invention contemplates that the center voltage inverter 26 and the left/right voltage inverter 24 operate on a line-to-neutral basis, and that the harmonic content of the resultant line-to-neutral voltage waves be sacrificed in order to obtain the most effective inverter action providing high fundamental content line-to-line voltage waves. If it is necessary, in a particular application, to accommodate single phase loads including a load reference or load neutral point, the present invention contemplates that a load reference or load neutral point be established without regard to the source neutral defined by the inverter system. Thus, the source and load neutral points float relative to each other. In the drawing of FIG. 1, the balanced loads $12_{a-n}$, $12_{b-n}$, and $12_{c-n}$ can be single-phase loads having a common connection at the nexus of the three legs, thus defining a load neutral. Alternatively, this may be accomplished by the use of Y-connected autotransformers, or multiple winding transformers, which establish a load neutral point independent of and isolated from the inverters. In these, and other arrangements for establishing a load neutral point, the load neutral has a voltage variation in relation to the neutral of the inverters, and accordingly, as noted, may be regarded as floating in relation to the inverter or source neutral. The harmonic content of the single-phase, line-to-load-neutral voltage supplied the load is that of the line-to-line voltage generated by the inverters which, as discussed above, is much less than that of the source or inverter line-to-neutral voltages.

The foregoing does not, of course, preclude connecting line-to-neutral loads back to the neutral of the inverters. However, single-phase loads connected in this way are supplied the higher harmonic source line-to-neutral voltages obtained with the present invention. This situation will be recognized as analogous to the use of the generator neutral as the load neutral in a power system having a Y-connected rotating machine generator.

THE INVERTER APPARATUS

Figure 5:
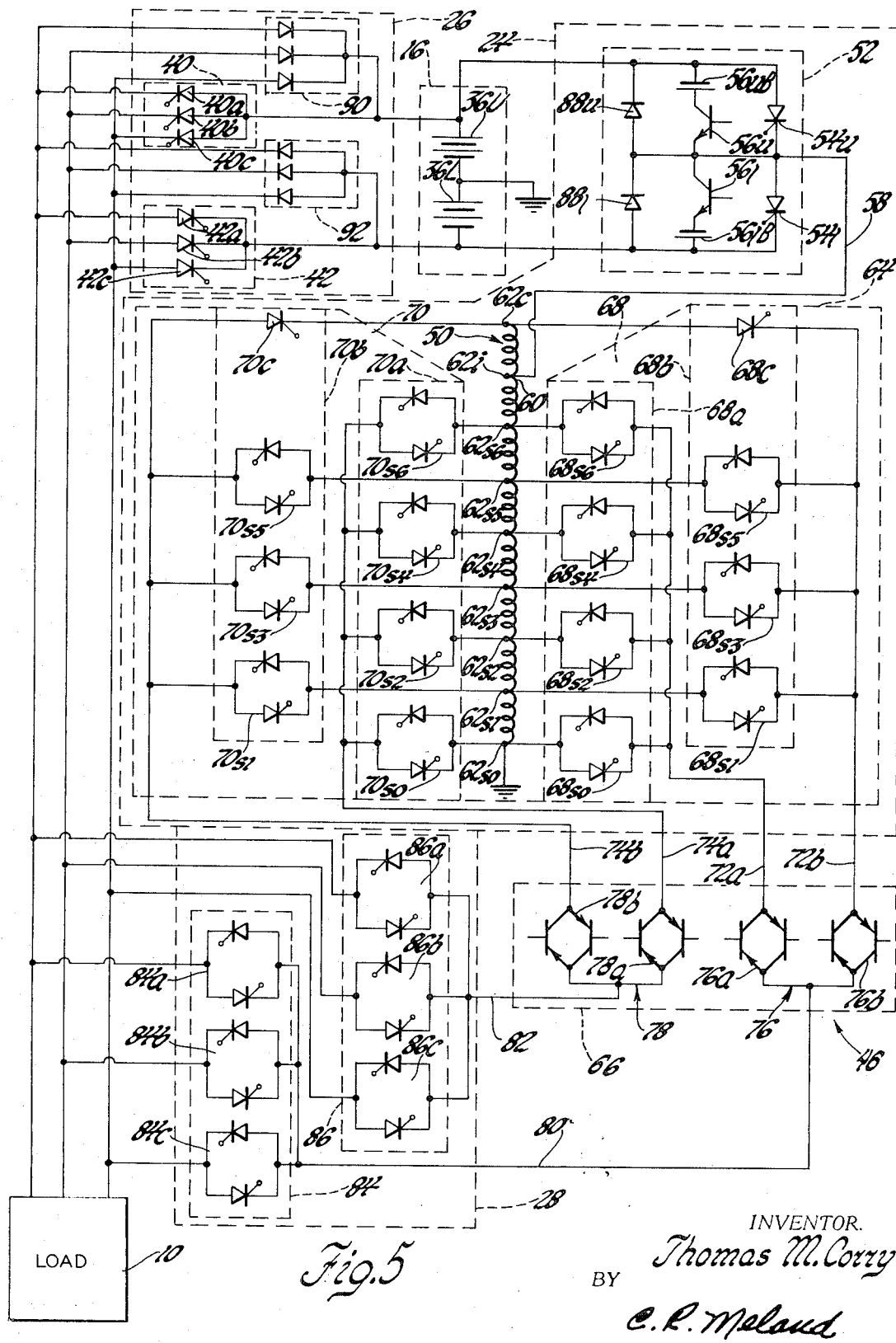
FIG. 5 is a circuit diagram of a specific apparatus useful in generating voltages in accordance with the preset invention.

FIG. 5 shows, in circuit diagram form, a three-phase inverter constructed in accordance with the present invention with portions corresponding to parts identified in FIG. 1 having like reference numerals.

More particularly, the center voltage generator 26 alternately provides positive and negative power center voltage portions at three times the preselected operating frequency of the line-to-line voltage waveforms $V_{a-b}$, $V_{b-c}$, and $V_{c-a}$. These are distributed in sequence as the portions UC and LC to the respective phases as illustrated in FIG. 2 and described above. The left/right or ascending and descending voltage generator 24 alternately produces the simultaneous upper left and right voltage segments $V_{ul}$ and $V_{ur}$ and the simultaneous lower left and right voltage segments $V_{ll}$ and $V_{lr}$ at three times the frequency of the line-to-line voltage waveforms $V_{a-b}$, $V_{b-c}$, and $V_{c-a}$. The left/right voltage distributor 28 applies the upper left and right voltage portions UL and UR and the lower left and right voltage portions LL and LR of FIG. 2 to the phase lines A, B, and C to define the corresponding upper and lower left and right waveform portions UL, UR, LL, and LR of each line-to-neutral voltage.

The generator or inverter 26 provides positive and negative output voltage pulses at a repetition rate three times the frequency of the output line-to-line wave. These pulses are selectively and alternately distributed to the three line conductors A, B, and C to develop the power center portions of the line-to-neutral voltages of FIG. 2. The controlled rectifiers 40a, 40b, and 40c make up a bank 40 connecting the positive terminal of the unidirectional source 16 to the respective three-phase lines A, B, and C. It will be observed that when the rectifiers 40a, 40b, and 40c are selectively made conductive, the full voltage of source 36U in relation to the neutral or ground connection is applied to the selected line A, B, or C. The controlled rectifiers 42a, 42b, and 42c similarly make up a bank 42 connecting the negative terminal of the unidirectional voltage source 16 respectively to the three-phase lines A, B, and C, so that as these rectifiers are selectively gated conductive, the selected line is made negative in relation to the neutral or ground in the amount of the voltage of source 36L. The voltage sources 36U and 36L have equal output levels so that by making the respective rectifiers in banks 40 and 42 conductive, the requisite power center voltages UC and LC of FIG. 2 are applied to the line conductors. The timing diagram of FIG. 7 shows the periods during which the respective controlled rectifiers are made conductive to provide a 60° power center, whereas the timing diagram of FIG. 9 shows an exemplary wave having a 92.8° power center produced by these controlled rectifiers. The rectifiers 40a, 40b, 40c, 42a, 42b, and 42c of the drawing are preferably silicon controlled rectifiers, each controlled rectifier being made conductive by application of a gate control voltage at the instant conduction is desired and being made nonconductive by reverse bias from a commutating pulse at the instant turnoff is desired. Specific ways of gating the respective rectifiers are described in further detail hereafter.

The ascending and descending voltages are derived from sources 36U and 36L via the flat-top full-wave single-phase inverter 52. The inverter 52 includes first and second drive voltage inverter switches $54_u$ and $54_l$ and first and second drive voltage commutator switches $56_u$ and $56_l$. The first and second drive voltage inverter switches $54_u$ and $54_l$ are unicontrol unilateral electronic switches, such as silicon controlled rectifiers. The first and second drive voltage commutator switches $56_u$ and $56_l$ are provided by bicontrol unilateral electronic switches, such as transistors. The auxiliary sources $56_{uB}$ and $56_{lB}$ serially connected with the respective commutating switches provide the requisite reverse bias potential for commutation of the inverter switches $54_u$ and $54_l$, all of which is more fully described below.

The first and second drive voltage inverter switches $54_u$ and $54_l$ are each connected between a different corresponding one of the upper and lower voltage sources 36U and 36L and an inverter output line 58. The first and second drive voltage commutator switches $56_u$ and $56_l$ are each connected to reverse bias a different corresponding one of the drive voltage inverter switches $54_u$ and $54_l$. The first and second drive voltage inverter switches $54_u$ and $54_l$ and the first and second drive voltage commutator switches $56_u$ and $56_l$ combine to produce square-wave drive voltage pulses on the inverter output line 58. The drive voltage alternates between the upper potential $E_{up}$ and the lower potential $E_{lp}$, of FIG. 2, three times for each cycle of the line-to-line voltage waveforms $V_{a-b}$, $V_{b-c}$, and $V_{c-a}$. Hence, the drive voltage is a square wave which alternately resides at the upper potential $E_{up}$ and at the lower potential $E_{lp}$ during successive 60 electrical degree intervals of the line-to-line or line-to-neutral voltages. The drive voltage commutator switches $56_u$ and $56_l$ commutate or turn off the corresponding ones of the drive voltage inverter switches $54_u$ and $54_l$ by connecting the auxiliary source voltage of sources $56_{uB}$ and $56_{lB}$, respectively, to reverse bias the inverter switches $54_u$ and $54_l$. This reverse bias is timed to occur when the inverter 52 is supplying minimum current, when the only current supplied is magnetizing current for the autotransformer 50. This necessitates the introduction of a dead-time period for the left/right voltage distribution system during each 60° of output line-to-line voltage during which the autotransformer is unloaded. When the power center exceeds 60°, the autotransformer has a dead time inherently determined by the time of the power center in excess of 60°, which may be sufficient.

The voltage reference device or autotransformer 50 comprises a single winding 60 having a multiplicity of voltage taps 62 including an input tap $62_i$, a group of step taps $62_s$, and a commutator tap $62_c$. The group of step taps $62_s$ is composed of a plurality (seven in the example of the drawing) of voltage taps $62_{s0}$–$62_{s6}$. The input tap $62_i$ is connected with the inverter output line 58. The step tap $62_{s0}$ is connected to the neutral point in common with the center tap of the source 16. Thus, in operation, the autotransformer 50 is subject to alternate positive and negative voltages from sources 36U and 36L applied through conductor 58 to tap $62_i$. This alternating voltage causes the flux linking the winding 60 to alternate substantially at the rate of the applied voltage between tap $62_i$ and ground. As a consequence, the taps $62_{s0}$, $62_{s1}$, $62_{s2}$, $62_{s3}$, $62_{s4}$, $62_{s5}$, and $62_{s6}$ substantially divide the total applied voltage in accordance with their proportionate turns in accordance with conventional transformer action. Thus, these respective taps each have substantially square-wave voltages with respect to ground that are in synchronism with the voltage at tap $62_i$. Each tap voltage is a percentage of the voltage at tap $62_i$ determined by the turns associated with the respective tap and the total turns to tap $62_i$. The step taps $62_{s0}$–$62_{s6}$ are spaced on the winding 60 so that each is at one of the upper set of step levels $E_{u0}$–$E_{u6}$, UR or UL of FIG. 2, when the drive voltage at the input tap $62_i$ is at the upper potential $E_{up}$ and at one of the lower set of step levels $E_{l0}$–$E_{l6}$, LR or LL of FIG. 2, when the drive voltage at the input tap $62_i$ is at the lower potential $E_{lp}$. It is noted that all the line-to-neutral waveforms of FIG. 2 include identical sets of upper and lower left and right steps and, accordingly, only one upper and one lower set of steps are labeled. Further, the commutator tap $62_c$ defines the upper commutator level $E_{uc}$ when the drive voltage at the input tap $62_i$ is at the upper potential $E_{up}$ and defines the lower commutator level $E_{lc}$ when the drive voltage at the input tap $62_i$ is at the lower potential $E_{lp}$.

The voltage level synthesizer 46 comprises a voltage level selector 64 and a voltage level commutator 66. The voltage level selector 64 includes first and second banks of voltage level selector switches 68 and 70. The first bank of voltage level selector switches 68 includes a first set of subbanks $68_a$ and $68_b$. The second bank of voltage level selector switches 70 includes a second set of subbanks $70_a$ and $70_b$. In addition, the first bank of voltage level selector switches 68 includes a first bank of step level selector switches $68_{s0}$–$68_{s6}$ and a first commutator level selector switch $68_c$. The second bank of voltage level selector switches 70 includes a second bank of step level selector switches $70_{s0}$–$70_{s6}$ and a second commutator level selector switch $70_c$. Each of the step level selector switches $68_{s0}$–$68_{s6}$ and $70_{s0}$–$70_{s6}$ is provided by a unicontrol bilateral electronic switch shown in the drawing of FIG. 5 as a pair of oppositely poled controlled rectifiers. Further, the first and second commutator level selector switches $68_c$ and $70_c$ are each provided by a unicontrol unilateral electronic switch shown as a single controlled rectifier.

The voltage level selector 64 includes a first set of voltage level selector lines comprising selector lines $72_a$ and $72_b$, and a second set of voltage level selector lines comprising selector lines $74_a$ and $74_b$. Each of the step level selector switches $68_{s0}$, $68_{s2}$, $68_{s4}$, and $68_{s6}$ comprising the first subbank $68_a$ of the selector switches $68_s$ is connected between the voltage level selector line $72_a$ and a different corresponding one of the step taps $62_{s0}$, $62_{s2}$, $62_{s4}$, and $62_{s6}$. Each of the step level selector switches $68_{s1}$, $68_{s3}$, and $68_{s5}$ comprising the second subbank $68_b$ of the selector switches $68_s$ is connected between the voltage selector line $72_b$ and a different corresponding one of the step taps $62_{s1}$, $62_{s3}$, and $62_{s5}$. In like manner, each of the step level selector switches $70_{s0}$, $70_{s2}$, $70_{s4}$, and $70_{s6}$ comprising the first subbank $70_a$ of the selector switches $70_s$ is connected between the voltage level selector line $74_a$ and a different corresponding one of the step taps $62_{s0}$, $62_{s2}$, $62_{s4}$, and $62_{s6}$. And each of the step level selector switches $70_{s1}$, $70_{s3}$, and $70_{s5}$ comprising the second subbank of the selector switches $70_s$ is connected between the voltage level selector line $74_b$ and a different corresponding one of the step taps $62_{s1}$, $62_{s3}$, and $62_{s5}$. The commutator level selector switch $68_c$ included in the subbank $68_b$ is connected between the voltage level selector line $72_b$ and the commutator tap $62_c$. The commutator level selector switch $70_c$ included in the subbank $70_b$ is connected between the voltage level selector line $74_b$ and the commutator tap $62_c$. Thus, as described and as shown in the drawing, the voltage level selector switches in each of the four subbanks of the selector switches $68_s$ and $70_s$ are connected between a corresponding one of the voltage level selector lines $70_a$, $70_b$, $72_a$, and $72_b$ and non-adjacent voltage taps 62 on the autotransformer 50.

The voltage level commutator shown generally at 66 comprises first and second banks of voltage level commutator switches 76 and 78. The first bank of voltage level commutator switches 76 includes a pair of commutator switches $76_a$ and $76_b$. The second bank of voltage level commutator switches 78 includes a pair of commutator switches $78_a$ and $78_b$. The voltage level commutator switches $76_a$ and $76_b$ in the first bank 76 and the voltage level commutator switches $78_a$ and $78_b$ in the second bank 78 are each provided by a bicontrol bilateral electronic switch, shown in the drawing as a pair of oppositely poled transistors. In addition, the voltage level commutator 66 includes first and second voltage level commutator lines or voltage output lines 80 and 82. Each of the voltage level commutator switches $76_a$ and $76_b$ is connected between a different corresponding one of the voltage level selector lines $72_a$ and $72_b$ and the first voltage level commutator line 80. Each of the voltage level commutator switches $78_a$ and $78_b$ is connected between a different corresponding one of the voltage level selector lines $74_a$ and $74_b$ and the second voltage level commutator line 82. Thus, each of the voltage level commutator switches $76_a$, $76_b$, $78_a$, and $78_b$ is connected between a different corresponding one of the subbanks $68_a$, $68_b$, $70_a$, or $70_b$ and a respective output line 80 or 82. The significance of these relationships will become more apparent later.

The voltage level synthesizer 46 is seen to comprise a first voltage level synthesizer including the first bank of voltage level selector switches 68 and the first bank of voltage level commutator switches 76 and a second voltage level synthesizer including the second bank of voltage level selector switches 70 and the second bank of voltage level commutator switches 78. The first bank of voltage level commutator switches 76 combines with the first bank of step level selector switches $68_s$ to produce one of the upper left or right voltage portions UL or UR of FIG. 2 or one of the lower left or right voltage portions LL or LR of FIG. 2 depending on the excitation polarity at tap $62_t$. The second bank of voltage level commutator switches 78 combines with the second bank of step level selector switches $70_s$ to produce the other of the upper left or right voltage portions UL or UR or the other of the lower left or right voltage portions LL or LR. Further, the first and second banks of voltage level commutator switches 76 and 78 each combine with the corresponding one of the first and second commutator level selector switches $68_c$ and $70_c$ to produce a different one of the upper and lower commutator voltage pulses $S_{uc}$ and $S_{lc}$ of FIG. 2.

The upper left and right voltage portions UL and UR are formed during the 60 electrical degree intervals when the drive voltage applied to the input tap $62_t$ is at the upper potential $E_{up}$ so that the upper set of step levels $E_{u0}$–$E_{u6}$ are available at the step taps $62_{s0}$–$62_{s6}$ respectively. One of the first and second banks of step level selector switches $68_s$ and $70_s$ connects successive ones of the transformer taps in ascending order during successive ones of the left set of step periods $P_{l0}$–$P_{l6}$ to define the individual voltage steps $E_{u0}$–$E_{u6}$ in the upper left voltage segment. Similarly, the other of the first and second banks of step level selector switches $68_s$ and $70_s$ connects successive ones of the transformer taps in descending order during successive ones of the right set of step periods $P_{r0}$–$P_{r6}$ to define the individual voltage steps $E_{u0}$–$E_{u6}$ in the upper right voltage portion UR.

In a similar manner, the lower left and right voltage portions LL and LR are formed during the 60 electrical degree intervals when the drive voltage applied to the input tap $62_t$ is at the lower potential $E_{lp}$ so that the lower set of step levels $E_{l0}$–$E_{l6}$ are available at the step taps $62_{s0}$–$62_{s6}$ respectively. One of the first and second banks of step level selector switches $68_s$ and $70_s$ connects successive ones of the transformer taps in ascending order during successive ones of the left set of step periods $P_{l0}$–$P_{l6}$ to define the individual voltage steps $E_{l0}$–$E_{l6}$ in the lower left voltage portion UL. The other of the first and second banks of step level selector switches $68_s$ and $70_s$ connects successive ones of the transformer taps in descending order during successive ones of the right set of step periods $P_{r0}$–$P_{r6}$ to define the individual voltage steps $E_{l0}$–$E_{l6}$ in the lower right voltage portion LR.

In addition, when the drive voltage applied to the input tap $62_t$ is at the upper potential $E_{up}$, the upper commutator voltage $E_{uc}$ is available at the commutator tap $62_c$. As the drive voltage shifts to the upper potential $E_{up}$, the commutator level selector switch $68_c$ in the first bank of voltage level selector switches 68 provides the upper commutator voltage pulse $S_{uc}$ of FIG. 2. Similarly, when the drive voltage applied to the input tap $62_t$ is at the lower potential $E_{lp}$, the lower commutator voltage $E_{lc}$ is available at the commutator tap $62_c$. As the drive voltage shifts to the lower potential $E_{lp}$, the second commutator level selector switch $70_c$ in the second bank of voltage level selector switches 70 provides the lower commutator voltage pulse $S_{lc}$ of FIG. 2.

In the preferred case, one of the first and second banks of voltage level selector switches 68 and 70 defines the upper right and lower left voltage portions UR and LL while the other of the first and second banks of voltage level selector switches 68 and 70 defines the lower right and the upper left voltage portions LR and UL. The preferred case simplifies the mechanization of the required timing generator (which will be described in detail later) by eliminating the need to turn off the step level selector switches $68_{s0}$ and $70_{s0}$ since the respective banks pass continuously from the upper right voltage portion UR to the lower left voltage portion LL and from the lower right voltage portion LR to the upper left voltage portion UL. As an alternate case, one of the first and second banks of voltage level selector switches 68 and 70 can define the upper and lower left voltage segments UL and LL while the other of the first and second banks of voltage level selector switches 68 and 70 can define the upper and lower right voltage portions UR and LR.

In operation, the step waves available as described are combined with a power center voltage portion from the inverter 26 to provide the three line-to-neutral voltages of FIG. 2 at any instant of time. As shown in the drawing, the 120° phase displacement of the three waves yields the useful result that one of the three is always supplied a power center unidirectional voltage of a first polarity while the other two are supplied step wave portions of the other polarity. Additionally, it should be observed from the drawing that a left and a right step portion are always simultaneously required, and neither two left portions nor two right portions are ever required at the same time.

As previously described, the voltage level commutator switches in the first and second banks 76 and 78 are each provided by a bicontrol electronic switch and the voltage level selector switches in the first and second banks 68 and 70 are each provided by a unicontrol electronic switch. The voltage level commutator switches in each of the first and second banks 76 and 78 commutate or turn off the voltage level selector switches in a different corresponding one of the first and second banks 68 and 70. This is best understood by analyzing the operation of the first bank of voltage level commutator switches 76 and the first bank of voltage level selector switches 68. However, it is to be noted that the operation of the second bank of voltage level commutator switches 78 and the second bank of voltage level selector switches 70 is substantially identical. In the following description, the term "gated" and the term "ungated" are employed in describing the operation of the various electronic switches. An electronic switch is "gated" when a bias signal is applied to the control electrode of the switch. An electronic switch is "ungated" when the bias signal is removed from the control electrode of the switch.

When one of the voltage level selector switches $68_{s0}$, $68_{s2}$, $68_{s4}$, and s6 in the subbank $68_a$ is gated, the voltage level commutator switch $76_a$ is also gated. In the gated condition, the voltage level commutator switch $76_a$ is conductive to permit conduction from the voltage level selector switches in the subbank $68_a$. Similarly, when one of the voltage level selector switches $68_{s1}$, $68_{s3}$, $68_{s5}$, and $68_c$ in the subbank $68_b$ is gated, the voltage level commutator switch $76_b$ is also gated. In the gated condition, the voltage level commutator switch 76$_b$ is conductive to permit conduction from the voltage level selector switches in the subbank 68$_b$. Further, when the voltage level commutator switch 76$_b$ is gated, the voltage level commutator switch 76$_a$ is ungated. In the ungated condition, the voltage level commutator switch 76$_a$ turns off to interrupt current from and turn off the previously gated one of the voltage level selector switches in the subbank 68$_a$. Likewise, when the voltage level commutator switch 76$_a$ is gated, the voltage level commutator switch 76$_b$ is ungated. In the ungated condition, the voltage level commutator switch 76$_b$ turns off to interrupt current from and turn off the previously gated one of the voltage level selector switches in the subbank 68$_b$. This procedure is continuously repeated as the voltage level selector switches in the first bank 68 are sequentially gated in alternate ascending and descending order.

Preferably, the voltage level commutator switches 76$_a$ and 76$_b$ are alternatively turned on and turned off simultaneously. That is, the voltage level commutator switch 76$_b$ is gated and rendered conductive at the same instant the voltage level commutator switch 76$_a$ is ungated and rendered nonconductive, and vice versa. However, due to the inherent time lag between the time when a transistor is ungated and the time when the transistor ceases conduction, the gated one of the voltage level commutator switches 76$_a$ and 76$_b$ actually turns on an instant before the ungated one of the voltage level commutator switches turns off. This turn on-before-turn off operation of the voltage level commutator switches 76$_a$ and 76$_b$ prevents the introduction of an open circuit condition of the load 10. A momentary short circuit condition is impressed between adjacent ones of the voltage taps 62 on the transformer 50; however, the resultant short circuit current is insignificant due to the overall current retarding effect provided by the inductance of the winding 60.

Due to the division of the first bank of voltage level selector switches 68 into the subbanks 69$_a$ and 68$_b$, the voltage applied across the voltage level commutator switches 76$_a$ and 76$_b$ in the first bank 76 is never greater than the maximum voltage difference between any two adjacent ones of the voltage taps 62 of the autotransformer 50. Accordingly, the maximum voltage rating of the voltage level commutator switches 76$_a$ and 76$_b$ is low in comparison to the maximum voltages generated by the transformer 50. This feature of the illustrated power supply 16 permits the voltage level commutator switches 76$_a$ and 76$_b$ and the voltage level commutator switches 78$_a$ and 78$_b$ to be mechanized with relatively low voltage transistors even where the voltage and energy output of the power supply are relatively high. The recovery time for the electronic switches of the voltage level synthesizers is on the order of 25 microseconds, and, accordingly, recovery time is not a constraint limiting the number of steps in the waveform at ordinary frequencies. Marginal improvement of the fundamental content of the resultant line-to-line voltages and engineering tradeoffs among size, complexity, cost, and reliability primarily determine the number of steps in the line-to-neutral voltage.

It is noted that the first and second banks of voltage level selector switches 68 and 70 may be separated into any desired number of subbanks or subgroups as long as the voltage level selector switches in each of the subbanks or subgroups are connected to different nonadjacent ones of the voltage taps 62 of the autotransformer 50. In addition, for each subbank or subgroup in each of the first and second banks of voltage level selector switches 68 and 70, a corresponding voltage level selector line and a corresponding voltage level commutator switch must be provided.

The left/right voltage distributor 28 comprises first and second groups of left/right phase selector switches 84 and 86. The first group of left/right phase selector switches 84 includes selector switches 84$_a$, 84$_b$, and 84$_c$, and the second group of left/right phase selector switches 86 includes selector switches 86$_a$, 86$_b$, and 86$_c$. Each of the phase selector switches 84$_a$, 84$_b$, 84$_c$, and 86$_a$, 86$_b$, and 86$_c$ is provided by a unicontrol bilateral electronic switch illustrated in the drawing by two oppositely poled controlled rectifiers. Each of the left/right phase selector switches 84$_a$, 84$_b$, and 84$_c$ in the first group 84 is connected between a different corresponding one of the phase lines A, B, and C and the first voltage output line 80. Each of the left/right phase selector switches 86$_a$, 86$_b$, and 86$_c$ in the second group 86 is connected between a different corresponding one of the phase lines A, B, and C and the second voltage output line 82.

Each of the first and second groups of left/right phase selector switches 84 and 86 applies a respective one of the upper left and right voltage portions UL and UR and a respective one of the lower left and right voltage portions LL and LR to the phase lines A, B, and C to define the corresponding upper and lower left and right waveform portions in each cycle of each of the line-to-neutral voltage waveforms $V_{a-n}$, $V_{b-n}$, and $V_{c-n}$ shown in FIG. 2. More particularly, the left/right phase selector switches in the first group 84 transmit the one of the upper left and right voltage portions UL and UR and the one of the lower left and right voltage portions LL and LR appearing on the first voltage output line 80. Similarly, the left/right phase selector switches in the second group 86 transmit the one of the upper left and right voltage portions UL and UR and the one of the lower left and right voltage portions LL and LR appearing on the second voltage output line 82.

In addition, each of the first and second groups of left/right phase selector switches 84 and 86 lc a respective one of the upper and lower commutator voltage pulses $S_{uc}$ and $S_{lc}$ to the phase lines A, B, and C to commutate a different one of the first and second banks of center voltage phase selector switches 40 and 42 through forced or reverse bias commutation. More specifically, the upper commutator voltage pulse $S_{uc}$ is applied by the left/right phase selector switches in the first group 84 to turn off the controlled rectifiers in the first bank 40 which transmit the upper center voltage portion UC. Similarly, the lower commutator voltage pulse $S_c$ is applied by the left/right phase selector switches in the second group 86 to turn off the controlled rectifiers in the second bank 42 which transmit the lower center voltage portion LC. However, according to an alternative embodiment, the first and second unilateral commutator level selector switches 68$_c$ and 70$_c$ can be replaced by a single bilateral commutator level selector switch and one of the first and second groups of left/right phase selector switches 84 and 86 can transmit both the upper and lower commutator voltage pulses $S_{uc}$ and $S_{lc}$.

Correspondingly, each of the first and second banks of center phase selector switches 40 and 42 applies a different one of the upper and lower center voltage segments UC and LC to the phase lines A, B, and C to commutate the first and second groups of left/right phase selector switches 84 and 86 through forced or reverse bias commutation. In particular, the upper center voltage portion UC is applied by the center voltage phase selector switches in the first bank 40 to turn off the left/right phase selector switches in the one of the first and second groups 84 and 86 which transmits the upper left voltage portion UL. The lower center voltage portion LC is applied by the center voltage phase selector switches in the second bank 42 to turn off the left/right phase selector switches in the one of the first and second groups 84 and 86 which transmits the lower left voltage portion LL. Starvation commutation effected by commutator switches 75 and 78 is required for loads with low power factors. As noted above, in the preferred case, these two commutations are the only ones required for the groups 84 and 86.

In the preferred case, a different one of the first and second groups of left/right phase selector switches 84 and 86 is turned off by each of the upper and lower center voltage portions UC and LC. In the alternate case, the one of the first and second groups of left/right phase selector switches 84 and 86 which transmits the upper and lower left voltage portions UL and LL is alternately turned off by both the upper and lower center voltage segments UC and LC. Further, in the alternate case, the one of the first and second groups of left/right phase selector switches 84 and 86 which transmits the upper and lower right voltage portions UR and LR is inherently commutated by forced commutation when the upper and lower right voltage portions UR and LR are at the neutral potential $E_{np}$. Hence, in either the preferred case or the alternate case, the illustrated power supply 16 provides complementary commutation between the first and second banks of center phase selector switches 40 and 42 and the first and second groups of left/right phase selector switches 84 and 86.

As previously described, the first and second banks of step level selector switches $68_s$ and $70_s$, the first and second banks of voltage commutator switches 76 and 78, and the first and second groups of left/right phase selector switches 84 and 86 are all provided by bilateral electronic switches. Hence, if a pair of bypass diodes $88_u$ and $88_l$ are each connected across a different corresponding one of the drive voltage inverter switches $54_u$ and $54_l$, as shown in the drawing, a reactive current path exists through the left/right voltage distributor 28 and through the left/right voltage generator 24 at any instant in time. Accordingly, the illustrated power supply 16 can operate into a load 10 having a power factor down to the cosine of the angle at which the power center begins. Further, if first and second groups of bypass diodes 90 and 92 are each connected across a different corresponding one of the first and second banks of center phase selector switches 40 and 42, as shown in the drawing, a reactive current path also exists through the center voltage distributor 26 and the center voltage generator 22 at any instant in time. Accordingly, the illustrated power supply 16 can operate into a load 10 which exhibits down to approximately 0.0 leading or lagging power factor.

FIG. 6 presents a timing diagram which defines the operation of the various electronic switches in the left/right voltage generator 24 over one-third of a cycle or a 120 electrical degree interval. The timing sequence illustrated in FIG. 6 is repeated three times to form a full cycle of 360 electrical degrees. FIG. 7 presents a timing diagram which defines the operation of the various electronic switches in the center voltage distributor 26 and the left/right voltage distributor 28 over a full cycle of 360 electrical degrees. The cross-hatched areas in FIGS. 6 and 7 represent the time periods during which the respective electronic switches are gated conductive. The control and timing sequence of FIGS. 6 and 7 produce a waveform having seven voltage steps and a 60° power center similar to that shown in FIG. 2, and the amplitudes and durations of the steps are determined in accordance with Example 10 above with the addition of commutating pulses.

FIGS. 8 and 9 are control and timing diagrammatics for generating line-to-neutral voltages of five steps having a power center of 92.8° (87.8° plus 5° commutation pulse). The apparatus required differs from that of FIG. 5 in that five voltage taps s0are positioned to provide the desired voltage steps and the tap points $62_{s6}$ and $62_{s5}$ and the related switches are omitted. Example 6 above gives the requisite voltages, including commutating pulses. The cross-hatched areas in FIGS. 8 and 9 show the time periods in which the respective electronic switches are gated conductive.

The requisite overall timing control may be achieved by providing a suitable source of pulses, serving as clock pulses. These are preferably fed to a digital counter, which counts a selected number of clock pulses, resets to zero, and then repeats the count. Each full count represents the full 360° period. A suitable number of counts in a binary digital system is, for example, 1,024, representing 10 significant figures in a binary number. Each count then represents about 0.3° of the fundamental wave, and the respective switches can be turned on or off to this time accuracy. Thus, for example, if it is desired to switch at 60°, essentially, with the switches 78b and 78c, FIGS. 5 and 6, the count may be set to provide this action at 170 counts, which is substantially one-sixth of 1,024. Similarly, other switching action is initiated by the presence of a digital count equal to the proper proportion of the 360° total cycle.

FIG. 10 shows an alternative timing block diagram suitable for controlling the power supply in accordance with the timing diagrams shown in FIGS. 6 and 7 or FIGS. 8 and 9. A clock source 96 produces standard timing pulses at a fixed frequency which is a high multiple of the given frequency of the line-to-neutral voltage waveforms $V_{a-n}$, $V_{b-n}$, and $V_{c-n}$ and the line-to-line voltage waveforms $V_{a-b}$, $V_{b-c}$, and $V_{c-a}$. Conveniently, the clock source 96 may take the form of an LC oscillator or a crystal oscillator.

A first shift register 98 is indexed in response to the clock pulses. The first shift register 98 produces a voltage step timing pulse when reset. The voltage step timing pulses define the durations of voltage steps in the upper and lower left and right portions UL, UR, LL, and LR in the line-to-neutral voltage waveforms $V_{a-n}$, $V_{b-n}$, and $V_{c-n}$. That is, each of the voltage step timing pulses marks the termination of one voltage step and the initiation of another voltage step. A second shift register 100 is indexed in response to the voltage step timing pulses. The second shift register 100 produces a voltage segment timing pulse in response to an appropriate number of voltage step timing pulses. The voltage segment timing pulses define the durations of the upper and lower center, left and right voltage segments UC, LC, UL, UR, LL, and LR in the line-to-neutral voltage waveforms $V_{a-n}$, $V_{b-n}$, and $V_{c-n}$. That is, each of the voltage segment timing pulses marks the termination of one voltage segment and the initiation of another voltage segment. A third shift register 102 is indexed in response to the voltage segment clock pulses. Preferably, the first and second shift registers are 8-bit registers while the third shift register is a 6-bit register. A logic controller 104 is responsive to the indexing of the first shift register 98 and the indexing of the second shift register 100 to reset the first shift register 98 so as to appropriately time the voltage steps in the upper and lower left and right waveform portions UL, UR, LL, and LR of the line to neutral voltage waveforms $V_{a-n}$, $V_{b-n}$, and $V_{c-n}$.

A first logic decoder 106 is responsive to the indexing of the first shift register 98 and a voltage segment timing pulse to alternately provide appropriate bias signals for the first and second commutator level selector switches 68$_c$ and 70$_c$, and for the upper and lower drive voltage commutator switches 56$_u$ and 56$_l$. A second logic decoder 108 is responsive to the indexing of the second shift register 100 to provide appropriate bias signals for the first and second banks of step level selector switches 68$_s$ and 70$_s$, and for the first and second banks of voltage level commutator switches 76 and 78. A third logic decoder 110 is responsive to the indexing of the third shift register 102 to provide appropriate bias signals for the first and second banks of center voltage phase selector switches 40 and 42, for the first and second groups of left/right voltage phase selector switches 84 and 86, and for the upper and lower drive voltage inverter switches 54$_u$ and 54$_l$. Preferably, the bias signals are coupled from the logic decoders 106, 108, and 110 to the respective switches of the power supply 16 through photo responsive diodes. However, it will be appreciated that any suitable signal coupling devices may be employed.

Each of the foregoing timing control arrangements is exemplary of respective rudimentary timing control arrangements. Mechanization of a particular timing control is not basic to the present invention and, accordingly, no detailed, specific timing array is shown or described. For those skilled in the art, FIGs. 6 and 7 or FIGS. 8 and 9 could be readily mechanized by known logic arrays as could other switching sequences generated to practice the instant invention.

COMMUTATING PULSE INSERTION

Referring to FIG. 2, it is necessary to develop the upper and lower commutator voltage steps or pulses $S_{uc}$ and $S_{lc}$ in each cycle of each of the line-to-neutral voltage waveforms $V_{a-n}$, $V_{b-n}$, and $V_{c-n}$. The upper commutator voltage pulse $S_{uc}$ occurs between the upper center waveform portion UC and the upper right waveform portion UR. The lower commutator voltage pulse $S_{lc}$ occurs between the lower center waveform portion LC and the lower right waveform portion LR. Thus, the duration of the upper and lower commutator voltage pulses $S_{uc}$ and $S_{lc}$ is momentary. Further, the upper commutator voltage pulses $S_{uc}$ has magnitude $E_{uc}$ which is above the upper potential $E_{up}$, while the lower commutator voltage pulse $S_{lc}$ has a magnitude $E_{lc}$ which is below the lower potential $E_{lp}$.

The commutator voltage pulses $S_{uc}$ and $S_{lc}$ in the line-to-neutral voltage waveforms $V_{a-n}$, $V_{b-n}$, and $V_{c-n}$ produce corresponding commutator voltage pulses $S'_{uc}$ and $S'_{lc}$ in the line-to-line voltage waveforms $V_{a-b}$, $V_{b-c}$, and $V_{c-a}$. As might be expected, the presence of the commutator voltage pulses in the line-to-neutral voltage waveforms $V_{a-n}$, $V_{b-n}$, and $V_{c-n}$ and the line-to-line voltage waveforms $V_{a-b}$, $V_{b-c}$, and $V_{c-a}$ increases the total harmonic distortion slightly as discussed above in conjunction with Examples 3 and 6 for five voltage steps.

Further details as to these commutating pulses, and to their relationship with the timing pulses used to produce the respective steps in the upper and lower left and right waves, are set forth above in the description of the most preferred circuitry.

The inverter of the present invention accepts loads of low power factor since, viewed from the line conductors, current flow in both directions is possible through the inverter at all times. Accordingly, the system can accommodate loads having power factors down to zero. This and other characteristics make the inverter suitable for a wide variety of applications. If the clock pulses that determine frequency and phase for the output voltage are derived from a second alternating voltage source or otherwise arranged to provide output voltage synchronism, the apparatus of the present invention may be operated in parallel with such other source, with inherent load division stability. The apparatus of the present invention can be permanently connected to an independent synchronized voltage source. Upon failure of the other source, the apparatus of the present invention then picks up the load with no interruption of the continuous alternating voltage to the load.

Although the foregoing description has proceeded in terms of certain preferred embodiments, it should be appreciated that various changes and modifications could be engrafted on the examples within the scope of the appended claims. In particular, voltage amplitude and duration values recited in examples above and in the claims are typical values not necessitating exactitude in duplication to come within the scope of the claimed invention. Commutation pulses would distort the claimed values as typified by the effect observed in a comparison of examples 3 and 6; the modification is readily seen to be within the ambit of the claims and their guidelines by one skilled in the art.

I claim:

1. A three-phase inverter effective to generate substantially sine-wave voltages across a set of three-phase line conductors from a unidirectional voltage source having a center tap, the three-phase inverter comprising in combination: a first inverter connected between the source and the conductors and effective, by controlled rectifier action, to produce three-phase flat-top full-wave voltages on the respective line conductors in relation to the center tap, each conduction period being terminated by a commutating voltage on the respective line conductor sufficient to reverse bias the corresponding controlled rectifier; a second inverter connected to said source and operable to produce single-phase, flat-top voltage at a predetermined frequency; an inductor having a plurality of taps connected between said second inverter and the center tap, whereby alternating tap-flat voltage excitation appears thereacross at said predetermined frequency, said inductor further having at least one step-up tap in voltage multiplying position in relation to the flat-top voltage; a voltage distributor having two channels and means to connect the same to the three three-phase line conductors, respectively; means effective during the period each channel of the voltage distributor is connected to a line conductor to connect said first mentioned taps sequentially to the same in ascending or descending order so as to produce the corresponding stepped sequentially rising or falling voltages on said conductors to approximate on each conductor, in relation to the center tap, a balanced and symmetrical voltage; and means effective at the beginning of each of said periods momentarily to apply voltage from the last mentioned tap to the respective line conductor so as to commutate the first inverter in slaved relation to the operation of said last means.

2. The method of generating line-to-line three-phase voltage based on substantially flat-top line-to-neutral voltage and having limited harmonic distortion, characterized by the steps of: generating three line-to-neutral voltages having substantially like magnitude and waveforms in the form of alternate, substantially 60° upper and lower flat-top center wave portions, having a frequency $W/2\pi$, thereby providing line-to-line voltage devoid of even harmonics and multiples of the third harmonic; and interposing between said wave portions alternately descending and ascending symmetrical and balanced voltage waves each comprised of a plurality of voltage steps having curves that approximate the function:

$Y = K\, 2\sin(wt + \pi/6) - 1$ in the 0°–60° region, where $K$ is the magnitude of the center wave portions, whereby the total harmonic distortion of the line-to-line voltage is minimized.

3. The method of generating a voltage based on substantially flat-top component waves, characterized by the steps of: generating a pair of symmetrical and balanced component voltages having substantially like magnitudes and waveforms, one being displaced substantially 120° in relation to the other at the fundamental frequency of $w/2\pi$, each of said voltages having a substantially flat-top center portion and being defined in the 0°–90° region by voltages having amplitudes on the order of 0.0, 0.4, 0.7, and 1.0 per unit of the center portion voltage for substantially 6°, 12°, 17°, and 55°, respectively; and adding said component voltages so as to produce an additive voltage relatively free from harmonic distortion.

4. The method of generating a voltage based on substantially flat-top component waves, characterized by the steps of: generating a pair of symmetrical and balanced component voltages having substantially like magnitudes and waveforms, one being displaced substantially 120° in relation to the other at the fundamental frequency of $w/2\pi$, each of said voltages having a substantially flat-top center portion and being defined in the 0°–90° region by voltages having amplitudes on the order of 0.0, 0.3, 0.6, 0.8, and 1.0 per unit of the center portion voltage for substantially 5°, 9°, 12°, 14°, and 50°, respectively; and adding said component voltages so as to produce an additive voltage relatively free from harmonic distortion.

5. The method of generating a voltage based on substantially flat-top component waves, characterized by the steps of: generating a pair of symmetrical and balanced component voltages having substantially like magnitudes and waveforms, one being displaced substantially 120° in relation to the other at the fundamental frequency of $w/2\pi$, each of said voltages having a substantially flat-top center portion and being defined in the 0°–90° region by voltages having amplitudes on the order of 0.0, 0.2, 0.5, 0.7, 0.9, and 1.0 per unit of the center portion voltage for substantially 4°, 7°, 10°, 11°, 11°, and 47°, respectively; and adding said component voltages so as to produce an additive voltage relatively free from harmonic distortion.

6. A three-phase inverter for generating voltage at a preselected frequency $F_1$ from a source of unidirectional voltage having a center tap, comprising in combination: a set of three-phase line conductors; a first inverter connected between said source and said conductors providing an output alternating in polarity above and below said center tap at three times the frequency $F_1$ and effective to produce three-phase, full-wave voltages on said line conductors in relation to said center tap at said frequency $F_1$; a single-phase inverter connected to said source and operating in synchronism with said first inverter at three times said frequency $F_1$; an inductor having a plurality of taps connected between said single-phase inverter and said center tap, whereby an alternating flat-top voltage appears thereacross having a repetition rate three times the frequency of said frequency $F_1$; a voltage distributor having two channels and means to connect the same to the three three-phase line conductors, respectively, when said first inverter is not applying voltages thereto; and means effective during the period each channel of the voltage distributor is connected to a line conductor to connect said taps sequentially to the same in ascending or descending order so as to produce the corresponding stepped sequentially rising or falling voltages on said conductor to simulate a true sinusoidal voltage between each pair of respective line conductors.

7. A three-phase inverter effective to generate substantially sine-wave voltages across a set of three-phase line conductors from a unidirectional voltage source having a center tap, the inverter comprising in combination: a first inverter connected between the source and the conductors and effective, by controlled rectifier action, to produce three-phase flat-top full-wave voltages on the respective line conductors in relation to the center tap, each conduction period being terminated by a commutating voltage on the respective line conductor sufficient to reverse bias the corresponding controlled rectifier; a second inverter connected to said source and operable to produce single-phase, flat-top voltage at a predetermined frequency; an inductor having a plurality of taps connected between said second inverter and the center tap, whereby alternating flat-top voltage excitation appears thereacross at said predetermined frequency, said inductor further having at least one step-up tap in voltage multiplying position in relation to the flat-top voltage; a voltage distributor having two channels and means to connect the same to the three three-phase line conductors, respectively; means effective during the period each channel of the voltage distributor is connected to a line conductor to connect said first mentioned taps sequentially to the same in ascending or descending order so as to produce the corresponding stepped sequentially rising or falling voltages on said conductors and simulate a true sinusoidal voltage across each pair of respective line conductors; and means effective at the beginning of each of said periods to momentarily apply voltage from the last mentioned tap to the respective line conductor so as to commutate the first mentioned inverter in sequence with the operation of the last means.

8. In a three-phase electrical system including three separate phase lines and a neutral point having a neutral potential, apparatus for producing balanced three-phase sinusoidal line-to-line voltage waveforms having a given frequency by constructing balanced three-phase cyclical and symmetrical line-to-neutral voltage waveforms having the given frequency, the apparatus comprising: center voltage generating means for alternately producing upper and lower center voltage segments at three times the given frequency, the upper and lower center voltage segments substantially constant respectively at an upper potential above the neutral potential and at a lower potential below the neutral potential; left/right voltage generating means including voltage level developing means and voltage level synthesizing means, the voltage level developing means including transformer means for alternately producing an upper set of step voltage levels ranging between the neutral potential and the upper potential and a lower set of step voltage levels ranging between the neutral potential and the lower potential at three times the given frequency, the voltage level synthesizing means including a plurality of step level selector switches each associated with a different one of the step voltage levels in each of the upper and lower sets for alternately providing simultaneous upper left and right voltage segments and simultaneous lower left and right voltage segments at three times the given frequency, the upper left and right voltage segments ascending and descending respectively between the neutral potential and the upper potential in a series of discrete voltage steps, the lower left and right voltage segments descending and ascending respectively between the neutral potential and the lower potential in a series of discrete voltage steps, the discrete voltage steps having predetermined magnitudes of predetermined durations; center voltage distributing means connected between the center voltage generating means and the phase lines for applying the upper and lower center voltage segments to the phase lines to define corresponding upper and lower center waveform portions in each cycle of each of the line-to-neutral voltage waveforms; and left/right voltage distributing means connected between the left/right voltage generating means and the phase lines for applying the upper and lower left and right voltage segments to the phase lines to define corresponding upper and lower left and right waveform portions respectively in each cycle of each of the line-to-neutral voltage waveforms; whereby the three-phase line-to-line voltage waveforms are approximately sinusoidal.

9. In a three-phase electrical system including three separate phase lines and a neutral point having a neutral potential, apparatus for producing balanced three-phase sinusoidal line-to-line voltage waveforms having a given frequency by constructing balanced three-phase cyclical and symmetrical line-to-neutral voltage waveforms having the given frequency, the apparatus comprising: center voltage generating means connected to the neutral point for providing upper and lower center voltage portions each exceeding one-sixth of a cycle, the upper and lower center voltage portions being substantially constant respectively at an upper potential above the neutral and at a lower potential below the neutral; left/right voltage generating means including voltage level developing means and voltage level synthesizing means, the voltage level developing means including transformer means for alternately providing upper and lower sets of step voltage levels at three times the given frequency, the upper set of step voltage levels ranging between the neutral potential and the upper potential and the lower set of step voltage levels ranging between the neutral potential and the lower potential, the voltage level synthesizing means including voltage level selecting means and voltage level commutating means, the voltage level selecting means including first and second banks of unicontrol step level selector switches arranged in corresponding ones of first and second sets of subbanks, the step level selector switches in each of the subbanks of the first and second banks each associated with a different nonadjacent one of the step levels in each of the upper and lower sets of step voltage levels, the voltage level commutating means including first and second groups of bicontrol voltage level commutator switches, the bicontrol voltage level commutator switches in each of the first and second groups respectively connected in series between a common output and the unicontrol step voltage level selector switches in a different associated one of the subbanks in the first and second banks, the corresponding ones of the first and second banks of step level selector switches and the first and second groups of voltage level commutator switches connecting successive ones of the upper and lower sets of step levels during successive ones of left and right step periods to alternately define a different one of upper left and right voltage portions and a different one of lower left and right voltage portions, the upper left and right voltage portions ascending and descending respectively between the neutral potential and the upper potential in a series of discrete voltage steps, the lower left and right voltage portions descending and ascending respectively between the neutral potential and the lower potential in a series of discrete voltage steps, the discrete voltage steps having predetermined magnitudes and predetermined durations, the bicontrol voltage level commutator switches in each of the first and second groups commutating the unicontrol step voltage level selector switches in the corresponding ones of the first and second banks;

center voltage distributing means connected between the center voltage generating means and the phase lines for applying the upper and lower center voltage portions to the phase lines to define corresponding upper and lower center waveform portions in each cycle of each of the line-to-neutral voltage waveforms; and left/right voltage distributing means connected between the left/right voltage generating means and the phase lines for applying the upper and lower left and right voltage portions to the phase lines to define corresponding upper and lower left and right waveform portions in each cycle of each of the line-to-neutral voltage waveforms; whereby the three-phase line-to-line voltage waveforms are approximately sinusoidal.

10. A three-phase inverter for generating voltage at a preselected frequency $F_1$ from a source of unidirectional voltage having a center tap, comprising in combination: a set of three-phase line conductors; a first inverter connected between said source and said conductors and effective to produce three-phase, full-wave voltages on the respective line conductors in relation to the center tap at said frequency $F_1$; a single-phase, full-wave inverter connected to said source and operating at three times said frequency $F_1$; inductor means having two series of taps connected between said single-phase, full-wave inverter and said center tap, whereby alternating excitation voltage appears thereacross at three times said frequency $F_1$; and a voltage distributor effective to connect said inductor taps to said three-phase line conductors, respectively, when said first inverter is not applying voltage thereto, said voltage distributor providing connections between only one of said line conductors and only one of said series of inductor taps during each half-cycle of said alternating excitation voltage, said voltage distributor further having at least one pair of main switch elements connected between said one line conductor and said one series of taps, a pair of buses connected to each pair of said main switch elements, and secondary switch elements effective, sequentially, to connect taps of said one series of said transformer taps to said main switch elements through said buses, said main switch elements having current interrupting capability to terminate the circulating current between any two of said taps in sequential order so as to produce corresponding stepped sequentially rising or falling voltages on said conductors to simulate across the respective line conductors a substantially sinusoidal voltage.

11. A method for generating, on three output lines, three-phase substantially sinusoidal line-to-line voltages at a frequency $F_1$, the method comprising: generating and sequentially distributing to said three output lines square-wave voltages at a frequency three times said frequency $F_1$ with a dwell of said square-wave voltages for a time of at least 60° at said frequency $F_1$; generating ascending and descending left and right, upper and lower voltage waveform portions each comprised of a plurality of voltage steps alternating in polarity three times for each alteration at said frequency $F_1$; and distributing said ascending and descending wave portions sequentially to said three output lines so as to define between each pair of output lines a line-to-line voltage which closely approximates a sinusoidal, high fundamental content voltage.

12. A method for generating, on three output lines, three-phase substantially sinusoidal line-to-line voltages at a frequency $F_1$, the method comprising: generating square-wave voltages alternating in potential at a frequency three times said frequency $F_1$; distributing sequentially among said three output lines said square-wave voltages with a dwell time for each positive or negative alternation of said square-wave voltages of at least 60° at said frequency $F_1$; generating ascending and descending left and right, upper and lower voltage waveform portions each comprised of a plurality of voltage steps alternating in potential three times for each alternation at said frequency $F_1$; and distributing said ascending and descending wave portions sequentially to said three output lines so as to develop flat-top waves including said square wave voltages and said ascending and descending portions, whereby the resultant line-to-line voltages on said three output lines closely approximate sinusoidal, high fundamental content voltages.

13. A three-phase inverter for providing a substantially sinusoidal output at a preselected frequency $F_1$ from a source of unidirectional voltage, comprising in combination: a set of three-phase line conductors; a first inverter connected between said source and said conductors and effective to produce three-phase, full-wave voltages on the respective line conductors at said frequency $F_1$; a single-phase, full-wave inverter connected to said source and operating at three times said frequency $F_1$; an inductor having a plurality of taps connected across the output of said single-phase, full-wave inverter, whereby an alternating excitation voltage appears thereacross having a repetition rate three times said frequency $F_1$; a voltage distributor effective to connect said inductor taps to said three-phase line conductors, respectively, when said first inverter is not applying voltage thereto; and means effective as a control of said distributor to sequentially connect said taps in ascending or descending order so as to produce corresponding stepped sequentially rising or falling voltages to simulate across respective pairs of line conductors substantially sinusoidal voltages.

14. A three-phase inverter for generating voltage at a preselected frequency $F_1$ from a source of unidirectional voltage, comprising in combination: a set of three-phase line conductors; a first inverter connected between said source and said conductors providing an output alternating in polarity at three times said frequency $F_1$ and effective to produce three-phase, full-wave voltages on said line conductors at said frequency $F_1$; a single-phase inverter connected to said source and providing an alternating output in synchronism with said first inverter at three times said frequency $F_1$; means including a plurality of output taps connected across the output of said single-phase inverter, whereby a plurality of flat-top voltage levels appear thereacross having a repetition rate three times the frequency of said frequency $F_1$; a voltage distributor and means to connect the same to the three three-phase line conductors, respectively, when said first inverter is not applying voltage thereto; and means effective during the period said voltage distributor is connected to a line conductor to connect said taps sequentially to the same in ascending or descending order so as to produce the corresponding stepped sequentially rising or falling voltages on said conductor to simulate a true sinusoidal voltage between each pair of respective line conductors.

15. A three-phase inverter for generating substantially sinusoidal voltages at a preselected frequency on a set of three-phase line conductors from a unidirectional voltage source, comprising a first inverter connected between said source and said conductors, producing a substantially flat-topped output alternating in polarity at a rate three times said frequency, and developing three-phase full-wave voltages on said conductors at said frequency; a second, single-phase inverter connected with said source and providing an alternating output in synchronization with said first inverter at a rate three times said frequency and developing ascending and descending waveform portions; and a voltage distributor connected with said second inverter to apply said ascending and descending waveform portions to said conductors, respectively, to synthesize voltages between respective pairs of line conductors in substantial approximation to sinusoidal voltages at said frequency by combining respective ascending, descending, and flat-topped wave portions.

16. A method of generating, on three output lines, three-phase substantially sinusoidal line-to-line voltages at a predetermined frequency, from a DC voltage source, comprising generating, at a rate three times said frequency, square-wave voltage pulses and distributing said pulses sequentially to said lines to produce on each line square-wave pulses which dwell throughout a phase angle of at least 60°; generating, at a rate three times said frequency, ascending and descending voltage waveform portions each comprised of a plurality of voltage steps; and sequentially distributing said ascending and descending voltage waveform portions to said output lines to synthesize voltages between respective pairs of line conductors in substantial approximation to sinusoidal voltages at said frequency by combining respective ascending, descending, and flat-topped wave portions.

17. In a three-phase electrical system including three separate phase lines ad a neutral point having a neutral potential, apparatus for producing balanced three-phase sinusoidal line-to-line voltage waveforms by constructing balanced three-phase cyclical and symmetrical line-to-neutral voltage waveforms, the apparatus comprising: center voltage generating means connected to the neutral point for alternately providing upper and lower center voltage segments each extending over approximately a 60 electrical degree interval, the upper and lower center voltage segments substantially constant respectively at an upper potential above the neutral potential and at a lower potential below the neutral potential; left/right voltage generating means connected to the neutral point for alternately providing simultaneous upper left and right voltage segments and simultaneous lower left and right voltage segments each extending over approximately a 60 electrical degree interval, the upper left and right voltage segments ascending and descending respectively in a series of discrete voltage steps between the neutral potential and the upper potential, the lower left and right voltage segments descending and ascending respectively in a series of discrete voltage steps between the neutral potential and the lower potential; center voltage distributing means connected between the center voltage generating means and the phase lines for applying the upper and lower center voltage segments to the phase lines to define corresponding upper and lower center waveform portions in each cycle of each of the line-to-neutral voltage waveforms; and left/right voltage distributing means connected between the left/right voltage generating means and the phase lines for applying the upper left and right voltage segments and the lower left and right voltage segments to the phase lines to define corresponding upper left and right waveform portions and lower left and right waveform portions in each cycle of each of the line-to-neutral voltage waveforms; whereby the three-phase line-to-line voltage waveforms are approximately sinusoidal.

18. In a three-phase electrical system including three separate phase lines and a neutral point having a neutral potential, apparatus for producing balanced three-phase sinusoidal line-to-line voltage waveforms by constructing balanced three-phase cyclical and symmetrical line-to-neutral voltage waveforms, the apparatus comprising: center voltage generating means for providing upper and lower center voltage segments each extending over approximately a 60 electrical degree interval, the upper and lower center voltage segments substantially constant respectively at an upper potential above the neutral potential and at a lower potential below the neutral potential; left/right voltage generating means including voltage level developing means and voltage level synthesizing means, the voltage level developing means establishing upper and lower sets of step voltage levels and upper and lower commutator voltage levels, the upper set of step levels ranging between the neutral potential and the upper potential and the lower set of step levels ranging between the neutral potential and the lower potential, the upper commutator level residing above the upper potential and the lower commutator level residing below the lower potential, the voltage level synthesizing means connected with the voltage level developing means for producing upper and lower left and right voltage segments each extending approximately a 60 electrical degree interval and for producing upper and lower commutator voltage pulses, the upper left and right voltage segments ascending and descending respectively between the neutral potential and the upper potential in a series of discrete voltage steps having magnitudes determined by the upper set of step levels, the lower left and right voltage segments descending and ascending respectively between the neutral potential and the lower potential in a series of discrete voltage steps having magnitudes determined by the lower set of step levels, the upper and lower commutator voltage pulses having magnitudes determined by the upper and lower commutator levels; center voltage distributing means including first and second groups of unicontrol center voltage phase selector switches each connected between the center voltage generating means and a different one of the phase lines, the center voltage phase selector switches in each of the first and second groups applying a different one of the upper and lower center voltage segments to the phase lines to define corresponding upper and lower center waveform portions respectively in each cycle of each of the line-to-neutral voltage waveforms; and left/right voltage distributing means including first and second groups of unicontrol left/right phase selector switches each connected between the left/right voltage generating means and a different one of the phase lines, the left/right phase selector switches in each of the first and second groups applying a different one of the upper left and right voltage segments and a different one of the lower left and right voltage segments to the phase lines to define corresponding upper and lower left and right waveform portions respectively in each cycle of each of the line-to-neutral voltage waveforms, the left/right phase selector switches in each of the first and second groups further applying a different one of the upper and lower commutator voltage pulses to the phase lines to commutate the center voltage phase selector switches in a diferent one of the first and second groups through forced commutation, the center voltage phase selector switches in each of the first and second groups further applying a different one of the upper and lower center voltage segments to the phase lines to commutate the left/right phase selector switches in a different one of the first and second groups through forced commutation; whereby the three-phase line-to-line voltage waveforms are approximately sinusoidal.

19. A three-phase inverter effective to generate substantially sine-wave voltages on a set of three-phase line conductors from a unidirectional voltage source, the three-phase inverter comprising in combination: a first inverter connected between the source and the conductors effective, by controlled rectifier action, to produce three-phase flat-top voltages on the line conductors; a second inverter connected to said source and operable to produce a single-phase, flat-top output voltage at a predetermined frequency; an inductor having a plurality of taps connected across said second inverter output, whereby alternating flat-top voltage excitation appears thereacross at said predetermined frequency; a voltage distributor and means to connect the same to the three three-phase line conductors, respectively; and means effective during the period said voltage distributor is connected to a line conductor to connect said inductor taps sequentially to the same in ascending or descending order so as to produce the corresponding stepped sequentially rising or falling voltages on said conductors, whereby the combined flat-top and ascending-descending voltage waveforms developed on said conductors provide high fundamental, low harmonic approximately sinusoidal three-phase voltages on said conductors.

* * * * *